(12) United States Patent
da Silva et al.

(10) Patent No.: US 12,150,178 B2
(45) Date of Patent: Nov. 19, 2024

(54) RACH REPORT WITH BEAM SELECTION INFORMATION

(71) Applicant: Telefonaktiebolaget LM Ericsson (PUBL), Stockholm (SE)

(72) Inventors: Icaro L. J. da Silva, Solna (SE); Pradeepa Ramachandra, Linköping (SE); Angelo Centonza, Torrenueva Costa Granada (ES); Ali Parichehrehteroujeni, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 403 days.

(21) Appl. No.: 17/428,532

(22) PCT Filed: Feb. 5, 2020

(86) PCT No.: PCT/SE2020/050106
§ 371 (c)(1),
(2) Date: Aug. 4, 2021

(87) PCT Pub. No.: WO2020/167208
PCT Pub. Date: Aug. 20, 2020

(65) Prior Publication Data
US 2022/0132578 A1  Apr. 28, 2022

Related U.S. Application Data

(60) Provisional application No. 62/805,774, filed on Feb. 14, 2019, provisional application No. 62/805,900, filed on Feb. 14, 2019.

(51) Int. Cl.
*H04W 74/0833* (2024.01)
*H04W 24/10* (2009.01)

(52) U.S. Cl.
CPC ....... *H04W 74/0833* (2013.01); *H04W 24/10* (2013.01)

(58) Field of Classification Search
None
See application file for complete search history.

(56) References Cited

U.S. PATENT DOCUMENTS 10,609,610 B2 * 3/2020 Park .................. H04B 7/088
2017/0346545 A1 11/2017 Islam et al.
2023/0232465 A1 * 7/2023 Zhang ................ H04L 5/0053
370/329

FOREIGN PATENT DOCUMENTS

WO 2018 204863 A1 11/2018

OTHER PUBLICATIONS

3GPP TS 36.321 v15.4.0; Technical Specification; 3rd Generation Partnership Project; Technical Specification Group Radio Access Network; Evolved Universal Terrestrial Radio Access (E-UTRA); Medium Access Control (MAC) protocol specification (Release 15)—Dec. 2018.

(Continued)

*Primary Examiner* — Brian S Roberts
(74) *Attorney, Agent, or Firm* — Baker Botts L.L.P.

(57) ABSTRACT

According to some embodiments, a method for reporting random access attempts performed by a wireless device comprises performing a random access procedure, wherein the random access procedure comprises a plurality of random access attempts, and each random access attempt is associated with a beam. For each random access attempt, the method comprises, upon determining the random access attempt is unsuccessful, storing information about random access resources associated with the beam associated with the random access attempt. The method further comprises (Continued)

reporting the information about the random access resources associated with the beam to a network node.

18 Claims, 25 Drawing Sheets

(56) References Cited

OTHER PUBLICATIONS

3GPP TS 38.211 v15.4.0; Technical Specification; 3rd Generation Partnership Project; Technical Specification Group Radio Access Network; NR; Physical channels and modulation (Release 15)—Dec. 2018.

3GPP TS 38.213 v15.4.0; Technical Specification; 3rd Generation Partnership Project; Technical Specification Group Radio Access Network; NR; Physical layer procedures for control (Release 15)—Dec. 2018.

3GPP TS 38.214 v15.4.0; Technical Specification; 3rd Generation Partnership Project; Technical Specification Group Radio Access Network; NR; Physical layer procedures for data (Release 15)—Dec. 2018.

3GPP TS 38.321 v15.4.0; Technical Specification; 3rd Generation Partnership Project; Technical Specification Group Radio Access Network; NR; Medium Access Control (MAC) protocol specification (Release 15)—Dec. 2018.

3GPP TS 38.401 v15.4.0; Technical Specification; 3rd Generation Partnership Project; Technical Specification Group Radio Access Network; NG-RAN; Architecture description (Release 15)—Dec. 2018.

PCT International Search Report issued for International application No. PCT/SE2020/050106—Apr. 14, 2020.

PCT Written Opinion of the International Searching Authority issued for International application No. PCT/SE2020/050106—Apr. 14, 2020.

* cited by examiner

RACH REPORT WITH BEAM SELECTION INFORMATION

PRIORITY

This nonprovisional application is a U.S. National Stage Filing under 35 U.S.C. § 371 of International Patent Application Serial No. PCT/SE2020/050106 filed Feb. 5, 2020 and entitled "RACH REPORT WITH BEAM SELECTION INFORMATION" which claims priority to U.S. Provisional Patent Application No. 62/805,774 filed Feb. 14, 2019 and U.S. Provisional Patent Application No. 62/805,900 filed Feb. 14, 2019 all of which are hereby incorporated by reference in their entirety.

TECHNICAL FIELD

Particular embodiments relate to wireless communication, and more specifically to beam selection information in a random access channel (RACH) report.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

The Third Generation Partnership Project (3GPP) fifth generation (5G) radio access network (RAN) (also referred to as NG-RAN) architecture is described in 3GPP TS 38.401v15.4.0. An example is illustrated in FIG. 1.

FIG. 1 is a block diagram illustrating the 5G RAN architecture. The NG-RAN comprises a set of gNBs connected to the 5G core (5GC) through the NG interface. A gNB may support frequency division duplex (FDD) mode, time division duplex (TDD) mode, or dual mode operation. gNBs may be interconnected through the Xn interface. A gNB may include a gNB central unit (gNB-CU) and gNB distributed units (gNB-DUs). A gNB-CU and a gNB-DU are connected via an F1 logical interface. One gNB-DU is connected to only one gNB-CU. For resiliency, a gNB-DU may be connected to multiple gNB-CU by appropriate implementation.

NG, Xn and F1 are logical interfaces. The NG-RAN is layered into a radio network layer (RNL) and a transport network layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport.

A gNB may also be connected to a long term evolution (LTE) eNB via the X2 interface. Another architectural option is that where an LTE eNB connected to the evolved packet core (EPC) network is connected over the X2 interface with a NR-gNB. The latter is a gNB not connected directly to a CN and connected via X2 to an eNB for the sole purpose of performing dual connectivity.

The architecture in FIG. 1 can be expanded by splitting the gNB-CU into two entities. One entity is the gNB-CU-UP that serves the user plane and hosts the packet data convergence protocol (PDCP) and another entity is the gNB-CU-CP that serves the control plane and hosts the PDCP and radio resource control (RRC) protocol. A gNB-DU hosts the radio link control (RLC), media access control (MAC), and physical layer (PHY) protocols.

A user equipment (UE) uses a random access procedure to initiate data transfer with the network. Optimization of the random access channel (RACH) configuration in cells is a self-optimizing network (SON) feature for optimizing a mobile network system performance. A poorly configured RACH may result in higher call setup and handover delays because of frequent RACH collisions, or low preamble-detection probability and limited coverage. The amount of uplink resource reserved for RACH also affects the system capacity.

Therefore, a network operator should carefully monitor that the RACH parameters are appropriately set, considering factors such as the RACH load, the uplink interference, the traffic patterns and the population under the cell coverage. The task can be complicated because the factors may change dynamically. For example, if the antenna tilt is changed in a cell, it affects the rates of call arrival and handover in the cell and the surrounding cells, and therefore the RACH load per preamble in all the cells. A change in transmission power settings or handover thresholds may have similar effects.

Whenever such a network configuration change happens, the RACH self-optimization feature may automatically make appropriate measurements of the RACH performance and usage in all the affected cells and determine any necessary updates of the RACH parameters. Some useful measurements are UE reports of the number of RACH attempts needed to obtain access, or time elapsed from the first attempt until access is finally granted.

Adjustable RACH parameters may include any of the following: (a) split of RACH preambles between contention-free access, contention-based access with high payload, and contention-based access with low payload; (b) RACH back-off parameter value or the RACH transmission power ramping parameters; and (c) any other parameter may be adjusted if found useful by network operator.

In addition, the RACH optimization feature facilitates automatic configuration of physical random access channel (PRACH) parameters (including the PRACH resource configuration, preamble root sequence and cyclic shift configuration) to avoid preamble collisions with neighboring cells. The principle of this automatic configuration is similar to the automatic physical cell identifier (PCI) configuration SON feature: the PRACH configuration information is included in the X2 Setup and eNB Configuration Update procedures. Therefore, whenever a new eNodeB is initialized and learns about its neighbors via the automatic neighbor relation (ANR) function, the eNB can at the same time learn the neighboring PRACH configurations. The eNB can then select its own PRACH configuration to avoid conflicts with the neighboring ones.

Whenever a conflict is identified, one of the cells may change its configuration, but the algorithm for selecting which cell should change and in what manner is not specified. The network operator can also combine PRACH self-optimization with manual configuration if necessary, but this is typically more error-prone and more time consuming than automatic RACH optimization.

LTE includes reporting of RACH information and failures. The network may request a report of RACH information when random access procedure is performed via the UE Information procedure in RRC when a RACH procedure is successful. The procedure is summarized below, as described in RRC specifications. An example is illustrated in FIG. 2.

FIG. 2 is a flow diagram illustrating an example UE information procedure. The evolved universal terrestrial radio access network (E-UTRAN) initiates the procedure by sending the UEInformationRequest message. The E-UTRAN initiates this procedure only after successful security activation.

Upon receiving the UEInformationRequest message and after successful security activation, the UE may perform the following steps. If rach-ReportReq is set to true, then set the contents of the rach-Report in the UEInformationResponse message as follows. Set the numberOfPreamblesSent to indicate the number of preambles sent by the MAC for the last successfully completed random access procedure. If contention resolution was not successful as specified in 3GPP TS 36.321 for at least one of the transmitted preambles for the last successfully completed random access procedure, then set the contentionDetected to true, otherwise set the contentionDetected to false. The UE submits the UEInformationResponse message to lower layers for transmission via signaling radio bearer one (SRB1).

The E-UTRAN uses the UEInformationRequest command to retrieve information from a UE.

Signalling radio bearer: SRB1
RLC-SAP: AM
Logical channel: DCCH
Direction: E-UTRAN to UE UEInformationRequest Message

```
-- ASN1START
UEInformationRequest-r9    ::=         SEQUENCE {
    rrc-TransactionIdentifier          RRC-
TransactionIdentifier,
    criticalExtensions                 CHOICE {
        c1                             CHOICE {
            ueInformationRequest-r9
            UEInformationRequest-r9-IEs,
            spare3 NULL, spare2 NULL, spare1 NULL
        },
        criticalExtensionsFuture       SEQUENCE { }
    }
}
UEInformationRequest-r9-IEs ::=        SEQUENCE {
    rach-ReportReq-r9                  BOOLEAN,
    rlf-ReportReq-r9                   BOOLEAN,
    nonCriticalExtension
    UEInformationRequest-v930-IEs      OPTIONAL
}
...
-- ASN1STOP
```

The rach-ReportReq field indicates whether the UE shall report information about the random access procedure.

The UE uses the UEInformationResponse message to transfer information requested by the E-UTRAN.

Signalling radio bearer: SRB1 or SRB2 (when logged measurement information is included)
RLC-SAP: AM
Logical channel: DCCH
Direction: UE to E-UTRAN UEInformationResponse Message

```
-- ASN1START
UEInformationResponse-r9 ::=           SEQUENCE {
    rrc-TransactionIdentifier          RRC-
TransactionIdentifier,
    criticalExtensions                 CHOICE {
        c1                             CHOICE
        {
            ueInformationResponse-r9
            UEInformationResponse-r9-IEs,
            spare3 NULL, spare2 NULL, spare1 NULL
        },
        criticalExtensionsFuture       SEQUENCE { }
    }
}
UEInformationResponse-r9-IEs ::=       SEQUENCE {
    rach-Report-r9                     SEQUENCE {
        numberOfPreamblesSent-r9
        NumberOfPreamblesSent-r11,
        contentionDetected-r9          BOOLEAN
    }
                OPTIONAL,
    rlf-Report-r9                      RLF-Report-
r9  OPTIONAL,
    nonCriticalExtension
    UEInformationResponse-v930-IEs     OPTIONAL
}
NumberOfPreamblesSent-r11::=           INTEGER (1..200)
-- ASN1STOP
```

For each RACH procedure, the UE stores the number of preambles sent, which corresponds to the parameter PREAMBLE_TRANSMISSION_COUNTER in MAC specifications (TS 36.321). In the LTE random access procedure, the UE sends a preamble and waits for a random-access response (RAR) during a pre-configured time window (RAR window). If the RAR does not come within that time, the UE adjusts some preamble transmission parameters (e.g., transmission power) and transmits the preamble again (referred to as power ramping adjustment). If the procedure is successful, at the n-th transmission the UE receives the response to the preamble. The number n is provided in the RACH report so that the network knows how many times the UE needed to ramp the power before the procedure was successful.

The random-access procedure, and specifically the meaning of the PREAMBLE_TRANSMISSION_COUNTER is described in more detail below according to the MAC specifications. First, the counter is initialized to 1. At the first preamble transmission attempt, the UE sets the preamble received target power, i.e., the expected power in the RACH receiver at the eNB, to the initial transmission power (parameter provided by the eNB, e.g., via SIB2 in LTE). These values may range from −120 dBm to −90 dBm and are provided as part of the power ramping parameters. This may also be a parameter to optimize later (a too large value may lead to a high RACH success rate, but may also create unnecessary uplink interference, which is problematic in high load scenarios).

As shown below, the PREAMBLE_RECEIVED_TARGET_POWER in the first attempt is the preambleInitialReceivedTargetPower+DELTA PREAMBLE (offset depending on the preamble format that has been configured by the network in prachConfigIndex, ranging from −3 dB to 8 dB). If no response is received within the configured RAR time window, PREAMBLE_TRANSMISSION_COUNTER (another parameter to possibly optimize) is incremented by 1. The UE checks whether the number of increments has reached its maximum value (also a configurable parameter to potentially optimize).

Assuming the UE may still perform preamble re-transmission, power ramping occurs, and the new preamble transmission power is incremented by a power ramping step (also an optimization candidate). The transmission power in the second attempt is:

PREAMBLE_RECEIVED_TARGET_POWER=preambleInitial
ReceivedTargetPower+DELTA_PREAMBLE+
1*powerRampingStep The parameter powerRampingStep may be 0 dB, 2 dB, 4 dB or 6 dB. The power ramping parameters are broadcasted in SIB2 as shown below.

```
PowerRampingParameters ::=         SEQUENCE {
    powerRampingStep               ENUMERATED  {dB0,
dB2,dB4, dB6},
    preambleInitialReceivedTargetPower  ENUMERATED {
                                        dBm-
120, dBm-118, dBm-116, dBm-114, dBm-112,
                                        dBm-
110, dBm-108, dBm-106, dBm-104, dBm-102,
                                        dBm-
100, dBm-98, dBm-96, dBm-94,
                                        dBm-92,
dBm-90}
}
```

The transmission power at the Nth attempt is:

PREAMBLE_RECEIVED_TARGET_POWER=preambleInitial
ReceivedTargetPower+DELTA_PREAMBLE+
N*powerRampingStep The preamble power ramping procedure, in case of multiple preamble transmission attempts, is described in more detail in the MAC specifications (3GPP TS 36.321).

For each RACH procedure the UE stores and possibly reports if contention was detected for at least one of the transmitted preambles, as described in 3GPP TS 36.321. Random access in LTE may either be configured as contention-based random access (CBRA), which includes an inherent risk of collision, or contention-free, where resources are reserved by the network for a particular UE at a particular time.

In a CBRA procedure, the UE randomly chooses a RACH preamble, which may result in more than one UE simultaneously transmitting the same signature, leading to a need for a subsequent contention resolution process. For some random access use cases, e.g., handovers, the eNodeB has the option of preventing contention by allocating a dedicated signature to a UE, resulting in contention-free access. This is faster than contention-based access, which is a particularly important factor for handover, which is time-critical, though it requires the network to reserve resources, which may not be very efficient. A fixed number (64) of preambles is available in each LTE cell, and the operation of the two types of RACH procedure depends on a partitioning of these signatures between those for contention-based access and those reserved for allocation to specific UEs on a contention-free basis.

In LTE, the UE may obtain RACH configuration in SIB2, in the IE RadioResourceConfigCommonSIB, e.g. when it transitions from idle to connected, or in RadioResourceConfigCommon, when it is handed over to another cell. In both cases the UE contains the field rach-ConfigCommon of IE RACH-ConfigCommon.

FIG. 3 is a flow diagram illustrating an example CBRA procedure. In the first step, the UE selects a preamble to transmit. The UE selects one of the available preambles for CBRA (which is 64 minus the number of preambles reserved for CFRA). This maximum value is provided as shown below in the rach-ConfigCommon:

| numberOfRA-Preambles | ENUMERATED { |
| --- | --- |
| n28, | n4, n8, n12, n16, n20, n24, |
| n52, n56, | n32, n36, n40, n44, n48, |
| | n60, n64} |

The set of contention-based signatures is further subdivided into two subgroups so that the choice of signature can carry one bit of information relating to the amount of transmission resources needed to transmit the message at Step 3.

From a L1 perspective, the preamble is transmitted in the PRACH, which is time and frequency multiplexed with PUSCH and PUCCH. An example is illustrated in FIG. 4.

FIG. 4 is a time and frequency diagram illustrating multiplexing of PRACH, PUSCH, and PUCCH. The horizontal axis represents time and the vertical axis represents frequency.

The network monitors PRACH resources to detect a random access attempt. PRACH time-frequency resources are semi-statically allocated within the PUSCH region and repeat periodically, as illustrated in FIG. 4. The exact PRACH configuration (i.e., the L1 aspects of RACH) is part of RadioResourceConfigCommonSIB, e.g. when the UE transitions from idle to connected, or in RadioResourceConfigCommon, when the UE is handed over to another cell. In both cases, the UE contains the field prach-Config of IE PRACH-ConfigSIB or PRACH-Config.

In the second step, upon sending the preamble, the UE monitors for a Random-Access Response (RAR) message. The RAR message is transmitted in the PDSCH and scheduled in the PDCCH.

To detect and decode the RAR, the UE monitors the SpCell PDCCH identified by the random access radio network temporary identifier (RA-RNTI) (e.g., instead of a cell radio network temporary identifier (C-RNTI), typically used for connected mode UEs to schedule data or control information on PDCCH/PDSCH). The RA-RNTI value used by the UE in the monitoring is known based on the selected preamble, because the RA-RNTI sent by the network unambiguously identifies which time-frequency resource was utilized by the MAC entity to transmit the RACH preamble. Thus, before monitoring for the RAR, the UE performs a specified mapping between its selected PRACH resource(s) where the preamble was transmitted and the RA-RNTI to be monitored in the RAR window to decode its RAR.

If multiple UEs had collided by selecting the same preamble in the same time-frequency resource, they would each receive the RAR with the same RA-RNTI. The RAR conveys the identity of the detected preamble, a timing alignment instruction to synchronize subsequent uplink transmissions from the UE, an initial uplink resource grant for transmission of the Step 3 message, and an assignment of a temporary C-RNTI (which may or may not be made permanent depending of the next step—contention resolution). The RAR message may also include a backoff indicator that the eNodeB can use to instruct the UE to back off for some time before retrying a RACH attempt.

FIG. 5 is a block diagram illustrating the MAC random access response. The 6 octets include the timing advance command, uplink grant, and temporary C-RNTI, as illustrated.

If the timer related to the RAR time window expires before the UE receives the RAR, the UE applies power ramping (as described above) before it retransmits a preamble. The retransmissions continue until the procedure succeeds or until a maximum number of attempts is reached (then a RACH failure is declared).

In the third step, the UE sends the Message 3, which is the first scheduled uplink transmission on the PUSCH. Message 3 includes a procedure message, such as an RRC connection request, RRC resume request, etc. Message 3 is addressed to the temporary C-RNTI allocated in the RAR at Step 2 and carries the C-RNTI or an initial UE identity. Message 3 relies on HARQ retransmissions.

If a preamble collision occurred at Step 1, the colliding UEs will receive the same temporary C-RNTI through the RAR and will also collide in the same uplink time-frequency resources when transmitting their respective Message 3 (because they have received the same RAR). This may result in such interference that no colliding UE can be decoded, and the UEs restart the RACH procedure after reaching the maximum number of HARQ retransmissions, which may avoid the need for contention resolution (unless they select again the same preamble, which is unlikely).

However, if at least one UE is successfully decoded, the contention remains unresolved for the other UEs at this step. The MAC downlink message (in Step 4) facilitates a quick resolution of the contention.

The fourth step is contention resolution. If for at least one of the UEs sending Message 3, the network detected its content and properly acknowledged with HARQ, in the fourth step a contention resolution message is used.

The contention resolution message also uses HARQ. It is addressed to the C-RNTI (if indicated in Message 3) or to the temporary C-RNTI. In the latter case, the message echoes the UE identity contained in the RRC message (e.g., resume identifier, S-TMSI, etc.). The reason to distinguish these two cases is that if the UE is performing RACH during handover with CBRA, the target cell will allocate a C-RNTI in the handover command (prepared by target) which should have been a unique C-RNTI. Thus, as an indication that target detected the Message 3 (in this example a RRCConfigurationComplete message), the Message 4 is sent to the same C-RNTI. The assumption is that the C-RNTI allocated by target is unique and there is no source of confusion i.e. if another UE receives the Message 4 with a C-RNTI that is not its own, the UE knows collision has happened.

In the other case, when the UE does not have a C-RNTI allocated by the target, Message 4 uses the temporary C-RNTI. The same temporary C-RNTI may belong to multiple UEs, so the network needs to indicate for which UE Message 3 has been decoded and for which UE the network wants to indicate that contention was resolved. That is done by the echoing back the UE identifier in the RRC message (e.g., resume identifier, S-TMSI, etc.), which is unlikely to also be the same between multiple UEs.

For a collision followed by successful decoding of Message 3, the HARQ feedback is transmitted only by the UE which detects its own UE identity (or C-RNTI); other UEs understand there was a collision, transmit no HARQ feedback, and can quickly exit the current RACH procedure and start another one. The UE's actions upon reception of the contention resolution message therefore has three possibilities: (a) the UE correctly decodes the message, detects its own identity, and sends back a positive Acknowledgement (ACK); (b) the UE correctly decodes the message, discovers that it contains another UE's identity (contention resolution), and sends nothing back; or (c) the UE fails to decode the message or misses the DL grant and sends nothing back.

FIG. 6 is a flow diagram illustrating two UEs performing a transition from to idle to connected states with a collision. As described above, if the UE receives in Message 4 its C-RNTI allocated by target, or its temporary C-RNTI and its UE identifier transmitted in Message 3, the UE considers the contention resolution as successful. Otherwise, if the contention resolution timer expires or if the UE receives Message 4 with its temporary C-RNTI but a different UE identifier, the UE considers contention resolution failed and re-initiates the random access procedure. Because the next attempt may succeed, it is not visible to the network that a collision has occurred. Thus, the indication in the RACH report is actually the UE detection of a collision via detecting Message 4 content not addressed to itself.

The contention detection and contention resolution process in LTE is described in 3GPP TS 36.321.

As in LTE, the NR random access procedure is described in the NR MAC specifications and parameters are configured by RRC, e.g., in system information or handover (RRCReconfiguration with reconfigurationWithSync). Random access is triggered in many different scenarios, for example, when a UE is in RRC_IDLE or RRC_INACTIVE and wants to access a cell that it is camping on (i.e., transition to RRC_CONNECTED).

In NR, RACH configuration is broadcast in SIB1 as part of the servingCellConfigCommon (with both downlink and uplink configurations), where the RACH configuration is within the uplinkConfigCommon. The RACH parameters are within what is referred to as initialUplinkBWP, because it is the part of the uplink frequency that the UE accesses and searches for RACH resources.

RACH-ConfigGeneric Information Element

```
-- ASN1START
-- TAG-RACH-CONFIGGENERIC-START
RACH-ConfigGeneric ::=          SEQUENCE {
    prach-ConfigurationIndex         INTEGER (0..255),
    msg1-FDM                         ENUMERATED {one, two, four, eight},
    msg1-FrequencyStart              INTEGER (0..maxNrofPhysicalResourceBlocks-1),
    zeroCorrelationZoneConfig        INTEGER(0..15),
    preambleReceivedTargetPower      INTEGER (-202..-60),
    preambleTransMax                 ENUMERATED {n3, n4, n5, n6, n7, n8, n10, n20, n50, n100, n200},
    powerRampingStep                 ENUMERATED {dB0, dB2, dB4, dB6},
    ra-ResponseWindow                ENUMERATED {sl1, sl2, sl4, sl8, sl10, sl20, sl40, sl80},
    ...
}
-- TAG-RACH-CONFIGGENERIC-STOP
-- ASN1STOP
```

| RACH-ConfigGeneric field descriptions |
|---|
| msg1-FDM |
| The number of PRACH transmission occasions FDMed in one time instance. (see TS 38.211, clause 6.3.3.2) |
| msg1-FrequencyStart |
| Offset of lowest PRACH transmission occasion in frequency domain with respective to PRB 0. The value is configured so that |

| RACH-ConfigGeneric field descriptions |
| --- |
| the corresponding RACH resource is entirely within the bandwidth of the UL BWP. (see TS 38.211, clause 6.3.3.2).<br>powerRampingStep |
| Power ramping steps for PRACH (see TS 38.321, clause5.1.3).<br>prach-ConfigurationIndex |
| PRACH configuration index. For prach-ConfigurationIndex configured under beamFailureRecovery-Config, the prach-ConfigurationIndex can only correspond to the short preamble format, (see TS 38.211, clause 6.3.3.2).<br>preambleReceivedTargetPower |
| The target power level at the network receiver side (see TS 38.213, clause 7.4, TS 38.321, clauses 5.1.2, 5.1.3). Only multiples of 2 dBm may be chosen (e.g. −202, −200, −198, ...). |
| preambleTransMax |
| Max number of RA preamble transmission performed before declaring a failure (see TS 38.32, clauses 5.1.4, 5.1.5).<br>ra-ResponseWindow |
| Msg2 (RAR) window length in number of slots. The network configures a value lower than or equal to 10 ms (see TS 38.32, clause 5.1.4). UE ignores the field if included in SCellConfig.<br>zeroCorrelationZoneConfig |
| N-CS configuration, see Table 6.3.3.1-5 in TS 38.211 |

RACH-ConfigCommon Information Element

```
-- ASN1START
-- TAG-RACH-CONFIGCOMMON-START
RACH-ConfigCommon ::=                          SEQUENCE {
    rach-ConfigGeneric                             RACH-ConfigGeneric,
    totalNumberOfRA-Preambles                      INTEGER (1..63)
OPTIONAL,   -- Need S
    ssb-perRACH-OccasionAndCB-PreamblesPerSSB      CHOICE {
        oneEighth                                      ENUMERATED
{n4,n8,n12,n16,n20,n24,n28,n32,n36,n40,n44,n48,n52,n56,n60,n64
},
        oneFourth                                      ENUMERATED
{n4,n8,n12,n16,n20,n24,n28,n32,n36,n40,n44,n48,n52,n56,n60,n64
},
        oneHalf                                        ENUMERATED
{n4,n8,n12,n16,n20,n24,n28,n32,n36,n40,n44,n48,n52,n56,n60,n64
},
        one                                            ENUMERATED
{n4,n8,n12,n16,n20,n24,n28,n32,n36,n40,n44,n48,n52,n56,n60,n64
},
        two                                            ENUMERATED
{n4,n8,n12,n16,n20,n24,n28,n32},
        four                                           INTEGER (1..16),
        eight                                          INTEGER (1..8),
        sixteen                                        INTEGER (1..4)
    }
OPTIONAL,   -- Need M
    groupBconfigured                               SEQUENCE {
        ra-Msg3SizeGroupA                              ENUMERATED {b56,
b144, b208, b256, b282, b480, b640,
                                                                   b800,
b1000, b72, spare6, spare5,spare4, spare3, spare2, spare1},
        messagePowerOffsetGroupB                       ENUMERATED {
minusinfinity, dB0, dB5, dB8, dB10, dB12, dB15, dB18},
        numberOfRA-PreamblesGroupA                     INTEGER (1..64)
    }
OPTIONAL,   -- Need R
    ra-ContentionResolutionTimer                   ENUMERATED { sf8,
sf16, sf24, sf32, sf40, sf48, sf56, sf64},
    rsrp-ThresholdSSB                              RSRP-Range
OPTIONAL,   -- Need R
    rsrp-ThresholdSSB-SUL                          RSRP-Range
OPTIONAL,   -- Cond SUL
    prach-RootSequenceIndex                        CHOICE {
        l839                                           INTEGER (0..837),
        l139                                           INTEGER (0..137)
    },
    msg1-SubcarrierSpacing                         SubcarrierSpacing
OPTIONAL,   -- Cond L139
    restrictedSetConfig                            ENUMERATED
{unrestrictedSet, restrictedSetTypeA, restrictedSetTypeB},
    msg3-transformPrecoder                         ENUMERATED {enabled}
OPTIONAL,   -- Need R
    ...
}
-- TAG-RACH-CONFIGCOMMON-STOP
-- ASN1STOP
```

| RACH-ConfigCommon field descriptions |
| --- |
| messagePowerOffsetGroupB |
| Threshold for preamble selection. Value in dB. Value minus infinity corresponds to −infinity. Value dB0 corresponds to 0 dB, dB5 corresponds to 5 dB and so on. (see TS 38.321, clause 5.1.2) |
| msg1-SubcarrierSpacing |
| Subcarrier spacing of PRACH (see TS 38.211, clause 5.3.2). Only the values 15 or 30 kHz (<6 GHz), 60 or 120 kHz (>6 GHz) are applicable (see TS 38.211). If absent, the UE applies the SCS as derived from the prach-ConfigurationIndex in RACH-ConfigGeneric (see tables Table 6.3.3.1-1 and Table 6.3.3.2-2, TS 38.211). The value also applies to contention free random access (RACH-ConfigDedicated), to SI-request and to contention-based beam failure recovery (CB-BFR). But it does not apply for contention free beam failure recovery (CF-BFR) (see BeamFailureRecoveryConfig). |
| msg3-transformPrecoder |
| Enables the transform precoder for Msg3 transmission. If the field is absent, the UE disables the transformer precoder (see TS 38.213, clause 8.3) |
| numberOfRA-PreamblesGroupA |
| The number of CB preambles per SSB in group A. This determines implicitly the number of CB preambles per SSB available in group B. (see TS 38.321, clause 5.1.1). The setting should be consistent with the setting of ssb-perRACH-OccasionAndCB-PreamblesPerSSB. |
| prach-RootSequenceIndex |
| PRACH root sequence index (see TS 38.211, clause 6.3.3.1). The value range depends on whether L = 839 or L = 139. The short/long preamble format indicated in this IE should be consistent with the one indicated in prach-ConfigurationIndex in the RACH-ConfigDedicated (if configured). |
| ra-ContentionResolution Timer |
| The initial value for the contention resolution timer (see TS 38.321, clause 5.1.5). Value sf8 corresponds to 8 subframes, value sf16 corresponds to 16 subframes, and so on. |
| ra-Msg3SizeGroupA |
| Transport Blocks size threshold in bit below which the UE shall use a contention-based RA preamble of group A. (see TS 38.321, clause 5.1.2) |
| rach-ConfigGeneric |
| Generic RACH parameters |
| restrictedSetConfig |
| Configuration of an unrestricted set or one of two types of restricted sets, see TS 38.211, clause 6.3.3.1. |
| rsrp-ThresholdSSB |
| UE may select the SS block and corresponding PRACH resource for path-loss estimation and (re)transmission based on SS blocks that satisfy the threshold (see TS 38.213) |
| rsrp-ThresholdSSB-SUL |
| The UE selects SUL carrier to perform random access based on this threshold (see TS 38.321, clause 5.1.1). The value applies to all the BWPs. |
| ssb-perRACH-OccasionAndCB-PreamblesPerSSB |
| The meaning of this field is twofold: the CHOICE conveys the information about the number of SSBs per RACH occasion (L1 parameter 'SSB-per-rach-occasion'). Value oneEight corresponds to one SSB associated with 8 RACH occasions, value oneFourth corresponds to one SSB associated with 4 RACH occasions, and so on. The ENUMERATED part indicates the number of Contention Based preambles per SSB (L1 parameter 'CB-preambles-per-SSB'). Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). |
| totalNumberOfRA-Preambles |
| Total number of preambles used for contention based and contention free random access in the RACH resources defined in RACH-ConfigCommon, excluding preambles used for other purposes (e.g., for SI request). If the field is absent, then all 64 preambles are available for RA. The setting should be consistent with the setting of ssb-perRACH-OccasionAndCB-PreamblesPerSSB, i.e. it should be a multiple of the number of SSBs per RACH occasion. |

In LTE, the RACH report to assist the network to perform RACH optimization contains an indication that collision was detected. That information indicates that at some point before the RACH procedure succeeded, the same UE tried to access the network and experienced a collision.

The RACH report also contains the number of preamble transmissions until the procedure succeeded. The number of preamble transmission indicates what happened at the UE between the first transmission and the final successful transmission (e.g., the UE applied power ramping with a configured step and retransmitted the preamble).

NR includes similar power ramping and contention-based random access algorithms as described above for LTE. However, NR is different from LTE in some ways.

In NR, random access resource selection needs to be performed within a cell depending on measurements performed on synchronization signal blocks (SSBs) or channel state information reference signals (CSI-RSs). A cell in NR is defined by a set of SSBs that may be transmitted in one (typical implementation for lower frequencies e.g. below 6 GHz) or multiple downlink beams (typical implementation for higher frequencies e.g. above 6 GHz).

For the same cell, the SSBs carry the same physical cell identifier (PCI) and a master information block (MIB). For standalone operation, i.e., to support UEs camping on an NR cell, the SSBs also carry in SIB1 the RACH configuration, which comprises a mapping between the detected SSB covering the UE at a given point in time and the PRACH configuration (e.g., time, frequency, preamble, etc.) to be used. Each of the beams may transmit its own SSB which may be distinguished by an SSB index. An example is illustrated in FIG. 7.

FIG. 7 is a block diagram illustrating two networks, each transmitting SSB. The network at the top of FIG. 7 transmits a single transmission with a single SSB. The network at the bottom of FIG. 7 transmits multiple beams, each with its own SSB (e.g., SSB index 0 to 64).

The mapping between RACH resources and SSBs (or CSI-RS) is also provided as part of the RACH configuration (in RACH-ConfigCommon). Two relevant parameters are: (a) #SSBs-per-PRACH-occasion: ⅛, ¼, ½, 1, 2, 8 or 16, which represents the number of SSBs per RACH occasion; and (b) #CB-preambles-per-SSB preambles to each SS-block: within a RACH occasion, how many preambles are allocated.

In a first example, if the number of SSBs per RACH occasion is 1, and if the UE is under the coverage of a specific SSB (e.g., SSB index 2), there will be a RACH occasion for SSB index 2. If the UE moves and is now under the coverage of another specific SSB (e.g., SSB index 5), there will be another RACH occasion for that SSB index 5 (each SSB detected by a given UE may have its own RACH occasion). Thus, at the network side, upon detecting a preamble in a particular RACH occasion, the network knows which SSB the UE has selected and, consequently, which downlink beam is covering the UE, so that the network can continue the downlink transmission (e.g., RAR, etc). Because each SSB has its own RACH resource, a preamble detected there indicates to the network which SSB the UE has selected and therefore which downlink beam the network should use to communicate with the UE.

FIG. 8 is a time frequency diagram illustrating SSBs and PRACH occasions. The horizontal axis represents time and the vertical axis represents frequency. SS-Blocks 0 to 3 are each associated with PRACH resources, as indicated by the arrows.

Each SSB typically maps to multiple preambles (different cyclic shifts and Zadoff-Chu roots) within a PRACH occasion, so that it is possible to multiplex different UEs in the same RACH occasions because they may be under the coverage of the same SSB. A second example is illustrated in FIG. 9.

FIG. 9 is another time frequency diagram illustrating SSBs and PRACH occasions. In the illustrated example, the number of SSBs per RACH occasion is 2. Thus, a preamble received in a RACH occasion indicates to the network that one of two beams are being selected by the UE. Either the network has means via implementation to distinguish the two beams and/or should perform a beam sweeping in the downlink by transmitting the RAR in both beams, either simultaneously or, transmitting in one, waiting for a response from the UE, and if absent, transmitting in the other.

If in a first attempt the UE has selected an SSB (based on measurements performed in that cell), has transmitted with initial power a selected preamble associated to the PRACH resource mapped to the selected SSB, and has not received a RAR within the RAR time window, then according to the specifications, the UE may still perform preamble re-transmission (i.e., maximum number of allowed transmissions not reached).

As in LTE, at every preamble retransmission attempt, the UE may assume the same SSB as the previous attempt and perform power ramping similar to LTE. A maximum number of attempts is also defined in NR, which is also controlled by the parameter PREAMBLE_TRANSMISSION_ COUNTER.

Different from LTE, at every preamble retransmission attempt, the UE may alternatively select a different SSB, as long as that new SSB has an acceptable quality (e.g., its measurements are above a configurable threshold). When a new SSB (or, in more general terms, a new beam) is selected, the UE does not perform power ramping, but transmits the preamble with the same previously transmitted power (i.e., UE shall not re-initiate the power to the initial power transmission). An example is illustrated in FIG. 10

FIG. 10 is a sequence diagram illustrating preamble retransmission with beam reselection. At time t0, the UE selects the beam identified by SSB index 63 and transmits a preamble with power P0. The UE does not receive a RAR within the time window, and at time t1 the UE selects the beam identified by SSB index 63 again and transmits a preamble with power P1, which equals P0 plus an offset. The UE does not receive a RAR within the time window, and at time t2 the UE selects the beam identified by SSB index 64 and transmits a preamble with power P1.

NR MAC specifications (3GPP TS 38.321) define a variable referred to as PREAMBLE_POWER_RAMPING_ COUNTER for when the same beam is selected at a retransmission. At the same time, the previous LTE variable still exists (PREAMBLE_TRANSMISSION_COUNTER), so that the total number of attempts is still limited, regardless if the UE performs at each attempt SSB/beam re-selection or power ramping.

Thus, if the initial preamble transmission does not succeed, and the UE selects the same SSB/beam, PREAMBLE_ POWER_RAMPING_COUNTER is incremented and the transmission power is:

PREAMBLE_RECEIVED_TARGET_POWER= preambleReceivedTargetPower+DELTA_PREAMBLE+1*PREAMBLE_POWER_RAMPING_STEP;

If instead the UE selects a different SSB/beam, the PREAMBLE_POWER_RAMPING_COUNTER is not incremented and the transmission power is the same as in the first transmission:

PREAMBLE_RECEIVED_TARGET_POWER=preambleReceived
TargetPower+DELTA_PREAMBLE;

The preamble power ramping procedure, in case of multiple preamble transmission attempts, is described in the MAC specifications (3GPP TS 38.321).

As described above, collisions may occur in LTE in a cell when multiple UEs select the same RACH preamble and, consequently, transmit in the same time/frequency PRACH resources. In NR, collisions occur when multiple UEs select the same preamble associated to a beam (i.e. UEs may select the same SSB and CSI-RS), otherwise the time/frequency RACH resources would be different, because there may be different mappings between beams and RACH resources.

The contention resolution process in NR is similar to the one in LTE. If multiple UEs under the coverage of the same downlink beam select the same preamble, they will also monitor PDCCH using the same RA-RNTI and receive the same RAR content, including the same uplink grant for Message 3 transmission (among other things, e.g., timing advance, etc.). If both UEs transmit Message 3 on the same uplink grant, and if the network is able to decode at least one, a contention resolution exists (i.e., Message 4) so the UE knows that contention is resolved.

As in LTE, Message 4 addresses the UE either using a C-RNTI (if one was allocated by the target, e.g. in case of handovers or in case the UE is in RRC_CONNECTED), or a TC-RNTI (temporary C-RNTI), in case this is an incoming UE (e.g., from a state transition). As in LTE, if the network addresses the UE with a TC-RNTI, it also includes in the MAC payload the UE identity used in Message 3 (e.g., resume identifier).

The UE detecting the contention resolution message is able to detect if collision has occurred and if it needs to restart RACH again. That is done by analysing the contention message or upon the expiry of the contention resolution timer.

If the Message 4 includes the UE's TC-RNTI assigned in Message 2, and the contention resolution identity in the payload matches its identifier sent in Message 3, the UE considers contention resolved and is not aware that there was a collision. If Message 4 has the UE's TC-RNTI and the contention resolution identity in the payload does not match its identifier sent in Message 3, then the UE declares a collision and performs further actions, such as declaring RACH failure or performing another RACH attempt.

In summary, contention is unresolved and collision detected in two cases: (a) Message 4 addressing TC-RNTI and UE Identities do not match; and (b) contention resolution timer expires. Similar to the existing LTE solution for RACH optimization, the UE may log the occurrence of contention in the above cases.

The contention resolution in NR is described in the MAC specifications (3GPP TS 38.321).

There currently exist certain challenges. For example, in LTE reporting the number of preamble transmissions (i.e., PREAMBLE_TRANSMISSION_COUNTER) provides enough information to the network to optimize particular RACH configuration parameters. For example, it gives the network an idea of how many attempts the UE had from the initial preamble power until the actual transmitted preamble power when the procedure finally succeeded. That performance indicator gives an idea of performance impairments caused by RACH in a successful procedure.

In NR, especially for a cell that comprises multiple SSBs (or SSBs defining a cell are transmitted in multiple downlink beams), or a cell deploying RACH mapping where a UE may select one or multiple CSI-RSs (even for a cell with a single SSB) which is likely to be the case especially for high frequency ranges (e.g., above 6 GHz), the LTE solution for RACH report and, consequently, the self-optimization may not work properly because it does not provide the whole picture of what happened in the random access procedure.

One reason is that in NR, as described above, the UE performs beam selection (e.g., SSB or CSI-RS) before preamble transmission (there is first a beam selection, or SSB/CSI-RS selection, that is later mapped to a Random Access Resource selection, as described in 3GPP TS 38.321 Section 5.1.2.

Thus, before the UE transmits a preamble the UE first selects an SSB (or a CSI-RS resource, or a beam in more general terms) that maps to a PRACH resource associated according to the configuration (e.g., broadcast in SIB1). Differently from LTE, if after preamble transmission the UE does not receive a RAR message associated within the RAR time window, the UE has at least two alternatives each time the preamble transmission is not followed by a RAR (i.e., when the RAR time window expires before the RAR reception upon each preamble transmission).

One alternative is that the UE selects another beam (e.g., SSB or CSI-RS) that possibly maps to another PRACH resource, starting preamble transmission using the same transmission power used the previous time the beam was accessed (i.e., without incrementing the power from the previous transmission). Another alternative is that the UE does not re-select to another beam. The UE uses the same beam (e.g. SSB or CSI-RS)) mapped to the same PRACH resource and performs power ramping as specified (i.e., using a ramping step to the previously transmitted power).

As in LTE, at every PRACH preamble transmission, the UE increments the PREAMBLE_TRANSMISSION_COUNTER. Thus, reporting the counter as in LTE for RACH self-optimization indeed provides insights on how many times the UE has tried before it succeeded in the RACH procedure. However, due to the flexibility described above on how power ramping and preamble retransmission may be attempted, even with the knowledge of the preamble transmission counter, the network has no strong indication of what happened. For example, the network does not know whether the UE re-selected N times between different beams, possibly with overlapping coverage, or if the UE kept the same beam selected first and used the same PRACH resources and ramped the power to a certain level N2 times until it succeeded or, if a combination of these have been performed (e.g., the UE performed power ramping X times until it re-selected to another beam and finally succeeded).

Depending on the UE actions performed, the network may tune its RACH parameters differently even for the same reported value of number of RACH preamble transmission attempts. Thus, only reporting the number of RACH preamble transmission attempts, as in the existing solution in LTE, has severe limitations in NR.

In addition, in NR the decision at each PRACH preamble retransmission to either select the same beam and perform power ramping or to select a different beam and transmit the preamble with the same power of previous transmission, may depend on different factors at the UE, such as updates in the beam measurements after a number of failed RACH preamble transmission attempts. For example, at each failed attempt the UE may obtain updated beam measurements to make sure it should still select the same beam or not. Or, the UE may only get these measurements after a number of power ramping attempts in the same beam. To protect the network, a suitability parameter is provided to the UE so that only when measurements are above a certain threshold the UE is allowed to select a beam and transmit a preamble to the associated RACH. This is also a parameter that may be optimized in RACH self-optimization.

FIG. 11 is a sequence diagram illustrating ambiguities when using preamble retransmission with beam reselection. At time t0, the UE selects the beam identified by SSB index 63 and transmits a preamble with power P0. The UE does not receive a RAR within the time window, and at time t1 the UE selects the beam identified by SSB index 63 again and transmits a preamble with power P1, which equals P0 plus an offset. The UE does not receive a RAR within the time window, and at time t2 the UE selects the beam identified by SSB index 64 and transmits a preamble with power P1. The total number of random access attempts is 3 and the successful beam is the beam identified by SSB index 64. The network, however, is unaware that the UE failed random access using the beam identified by SSB index 63.

A similar problem exists with contention detection. As described above, both in LTE or NR, a UE trying to perform a contention-based random-access procedure may detect that contention resolution was not successful (i.e., that contention occurred due to collisions) upon the occurrence of one of two events for every preamble transmission attempt and RAR reception. One event is after transmitting Message 3 using a C-RNTI assigned by a target cell (e.g., in handover or when the UE is in RRC_CONNECTED), the UE detects a Message 4 not addressing its C-RNTI and the contention resolution timer expires. Another event is that after transmitting a Message 3 using a TC-RNTI assigned to it in the RAR, the UE detects a Message 4 addressing the same TC-RNTI but the UE Identity in the Message 4 payload does not match the UE's identity transmitted in Message 3.

Assuming LTE solution for RACH optimization assistance as baseline, the network may request a UE a RACH report in a UEInformationRequest message after security is activated and, upon that request the UE sets the contentionDetected field in the RACH report to 'true', to be included in the UEInformationResponse message.

| | |
|---|---|
| UEInformationResponse-r9-IEs ::= | SEQUENCE { |
| rach-Report-r9 | SEQUENCE { |
| numberOfPreamblesSent-r9 | |
| NumberOfPreamblesSent-r11, | |
| contentionDetected-r9 | BOOLEAN |
| } | |
| OPTIONAL, | |
| rlf-Report-r9 | RLF-Report- |
| r9  OPTIONAL, | |
| nonCriticalExtension | |
| UEInformationResponse-v930-IEs | OPTIONAL |
| } | |

In LTE, the indication of unsuccessful contention resolution informs the network that contention has been detected by the UE in that cell before the UE succeeded with random access. Without the RACH report, that information would not necessarily be visible to the network. The report may assist the network to perform RACH optimization such as a balanced split of contention-based and contention-free random-access preambles.

However, especially in NR where a cell may comprise multiple beams (either multiple SSBs for each cell or even in the case of a single SSB per cell, multiple beams in different CSI-RS resources), the information about unsuccessful contention resolution is of limited value.

One problem is that the UE may re-select to another beam after contention is detected. In NR every RACH attempt is preceded by a beam selection, where a beam may be an SSB of the cell the UE is trying to perform RACH or a CSI-RS resource.

Based on the beam selection, the UE determines the RACH resources to transmit the preamble, as described above. Thus, at every attempt the UE selects a beam, maps to a RACH resource and sends the preamble. If RAR reception is successful and later on contention is detected, as described above, specifications define that the UE shall try to perform random access once more. However, as the whole contention resolution process may take some time, the UE may select another beam in the next round, which could map to a different RACH resource. Thus, reporting an indication that contention was detected does not tell the whole story to the network because the UE may be accessing in a beam that is not necessarily the same one where the contention was detected. An example is illustrated in FIG. 12.

FIG. 12 is a sequence diagram illustrating ambiguities when using contention resolution with beam reselection. At time t, the UE selects the beam identified by SSB index 63 and contention is detected. The UE reinitiates RACH and at time t1 the UE selects the beam identified by SSB index 64 and the random access attempt is successful. The network requests a RACH report and the network knows that contention was detected but does not know on which beam.

Another problem is that at every RACH attempt, either contention or failure (absence or RAR) may occur, upon which the UE may perform beam change in the next attempt. For example, for a RACH procedure that has just been completed, there could have been contention detection (at least in one of the RACH preamble transmission attempts) combined with problems due to coverage, i.e., the UE may not receive the RAR in some cases before it selected another beam and is able to transmit Message 3 and receive Message 4 but detects contention.

At every preamble retransmission attempt the UE may select a different SSB, as long as that new SSB has an acceptable quality (e.g., its measurements are above a configurable threshold). When a new SSB (or, in more general term, a new beam) is selected, the UE does not perform power ramping, but transmits the preamble with the same previously transmitted power (i.e., the UE does not re-initiate the power to the initial power transmission). An example is illustrated in FIG. 10 described above. Thus, some random access scenarios may include both contention detection and preamble issues, with or without beam selection.

Because the parameters for partitioning RACH resources are also set per beam (e.g., per SSB), the lack of information of what happened during random access may lead to suboptimal usage of the RACH report. In NR, the mapping between RACH resources may be partitioned per beam (i.e., per SSB and/or per CSI-RS) and the mapping may be adjustable.

The RRC specifications include two main parameters for RACH optimization. One is ssb-perRACH-OccasionAndCB-PreamblesPerSSB. The parameter has two meanings. The CHOICE conveys the information about the number of SSBs per RACH occasion (L1 parameter 'SSB-per-rach-occasion'). Value oneEight corresponds to one SSB associated with 8 RACH occasions, value oneFourth corresponds to one SSB associated with 4 RACH occasions, and so on. The ENUMERATED part indicates the number of Contention Based preambles per SSB (L1 parameter 'CB-preambles-per-SSB'). Value n4 corresponds to 4 Contention Based preambles per SSB, value n8 corresponds to 8 Contention Based preambles per SSB, and so on. The total number of CB preambles in a RACH occasion is given by CB-preambles-per-SSB*max(1, SSB-per-rach-occasion).

A second parameter is totalNumberOfRA-Preambles. The total number of preambles is used for contention based and contention free random access in the RACH resources defined in RACH-ConfigCommon, excluding preambles used for other purposes (e.g., for SI request). If the field is absent, all 64 preambles are available for RA. The setting should be consistent with the setting of ssb-perRACH-OccasionAndCB-PreamblesPerSSB, i.e. it should be a multiple of the number of SSBs per RACH occasion.

SUMMARY

As described above, certain challenges currently exist with random access reporting when using beam selection. Certain aspects of the present disclosure and their embodiments may provide solutions to these or other challenges.

For example, particular embodiments include a method at a wireless terminal (also referred to as user equipment (UE)). The method comprises, after the transmission of a random access channel (RACH) preamble and the initiation of a timer for the random access response (RAR) time window, performing the following steps. Upon each attempt to transmit RACH preamble, logging/storing information of the beam selection procedure (e.g., synchronization signal block (SSB) or channel state information reference signal (CSI-RS)). Reporting to the network logged/stored information related to the beam selection procedure/random-access resource selection described above (i.e., report for select SSB and/or CSI-RS).

In some embodiments, the information above is only logged (and possibly reported in a RACH report) when the first RACH preamble transmission attempt is not successful. One reason is that if the first attempt is successful, then the network knows more about what happened in the procedure (e.g., first and last selected beam, no usage of ramping, etc.). This embodiment may be described as follows.

For each failed RACH preamble transmission attempt (i.e., upon the expiry of the RAR timer and detecting that a response was not received for a given preamble transmission/RACH resource selection), logging/storing the UE decision upon RACH attempt failure.

After the failure, the UE may select a different beam (e.g., SSB or CSI-RS) compared to the previous transmission that was not successful, or the UE may select the same beam (e.g., SSB or CSI-RS) compared to the previous transmission that was not successful.

In some embodiments, for each failed RACH preamble transmission attempt, the method may include logging/storing more detailed information related to the decision to select the same beam (e.g., SSB or CSI-RS) as in the previous preamble transmission and to ramp/increase the preamble transmission power (where that is increased having as reference the power of the previously transmitted preamble). The method may include logging/storing reference signal (RS) measurements for the RS of the beam selected and/or logging/storing measurement quantities for the RSs that were equal or stronger than the selected beam. The method may include logging/storing information related to the decision to select a different beam (e.g., SSB or CSI-RS) compared to the previous preamble transmission/RACH resource selection and, consequently, the decision to not ramp/increase the preamble transmission power (i.e., transmit the preamble with same power of the previously transmitted preamble).

In some embodiments, any of the logged/stored information described above is reported to the network. In particular embodiments, a UE logs beam selection information in RACH attempts in a RACH report, to be reported to the network (e.g., for mobility robustness optimization and/or RACH optimization and/or Coverage and capacity optimization (CCO)).

Some embodiments include detecting a collision event during a random access procedure performed upon the selection of a random-access resource mapped to a selected beam (e.g., SSB or CSI-RS) in the cell that the UE is performing random access. The method includes logging/storing for a collision event information related to the selection of a random-access resource mapped to a selected beam (e.g., SSB or CSI-RS) in the cell that the UE is performing random access where the collision has been detected.

The information may include any of the following: (a) beam identifier of the selected beam(s) (if SSB based RACH, a SSB identifier, if CSI-RS based RACH, a CSI-RS identifier; (b) radio conditions of the selected beam/beams (e.g., reference symbol receive power (RSRP), reference symbol receive quality (RSRQ), or signal to interference and noise ratio (SINR)); (c) time elapsed since the latest measurement sample the UE took before it selected the beam (i.e., a time information enabling the network to determine how up to date were the measurements the UE used to selecting a particular beam; or, in the case of retransmission, to make the decision between selecting a new beam or selecting the same beam); (d) similar information as above (radio conditions, time elapsed, beam identifier, etc.) for neighbor beams in the same cell that the UE is performing RACH; and (e) similar information as above (radio conditions, time elapsed, beam identifier, etc.) for neighbor beams in neighbor cells (i.e., not the cell in which the UE is performing RACH).

The logging indicated above for beam selection procedure may also be for the random-access resource selection where the selected SSB(s)/CSI-RS(s) maps to at least one random access resource. Particular embodiments include reporting the logged/stored information to the network.

Particular embodiments include a method at the network (e.g., a radio network node, like a gNodeB). The method comprises modifying at least on RACH parameter in RACH configuration, such as mapping between beams and RACH resources, initial power for preamble transmission, maximum number of attempts, and/or threshold for beam selection.

The method may further comprise informing neighbor nodes of updated RACH configurations and/or modifying the beamforming configurations of reference signals associated to the RACH resources.

For example, if many UEs report to have contention based random access (CBRA) issues in a particular beam, and if there is no other beam of the serving cell in the RACH report that is good enough, the network could in some embodiments split the single beam into two different beams so that the RACH configurations in two beams are separated in time. In some embodiments, the network may transmit two beams with the same beamforming configurations (i.e., covering the same area) thus potentially reducing the collision probability by 50% because the UE can choose any of the two beams for RA. If there is another beam of the serving cell in the RACH report that is good enough, the network may rotate all the beams of the cell by an angle that could potentially change the coverage area of beams in such a way that collision probability of RA in a single beam is reduced.

According to some embodiments, a method for reporting random access attempts performed by a wireless device comprises performing a random access procedure, wherein the random access procedure comprises a plurality of random access attempts, and each random access attempt is associated with a beam. For each random access attempt, the method comprises, upon determining the random access attempt is unsuccessful, storing information about random access resources associated with the beam associated with the random access attempt. The method further comprises reporting the information about the random access resources associated with the beam to a network node.

In particular embodiments, the method further comprises, for each random access attempt, upon determining the random access attempt is successful, storing information about random access resources associated with the beam associated with the random access attempt.

In particular embodiments, determining the random access attempt is unsuccessful comprises determining transmission of a random access channel (RACH) preamble failed and/or determining contention occurred during the random access attempt.

In particular embodiments, the information about random access resources associated with the beam associated with the random access attempt comprises an indication of whether the beam is the same beam as a previous unsuccessful random access attempt, a beam identifier such as a SSB identifier or a CSI-RS identifier, a reference signal measurement value associated with beam, an amount of time between when the reference signal measurement value associated with beam was measured and when the beam was used for the random access attempt, and/or a reference signal measurement value associated with a neighboring beam.

In particular embodiments, the information about random access resources associated with the beam associated with the random access attempt is stored chronologically in the order that the random access attempt occurred.

According to some embodiments, a wireless device is capable of performing a random access procedure. The wireless device comprises processing circuitry operable to perform any of the wireless device methods described above.

According to some embodiments, a method for reconfiguring random access resources performed by a network node comprises receiving a random access report from a wireless device. The random access report includes information about a plurality of random access attempts, each random access attempt associated with a beam, and for each random access attempt the random access report includes information about random access resources associated with the beam associated with the random access attempt. The method further comprises reconfiguring, based on the received random access report, RACH parameters for the network.

In particular embodiments, reconfiguring RACH parameters comprises modifying at least one of a number of available RACH preambles and a maximum number of random access attempts.

In particular embodiments, the information about random access resources associated with the beam associated with the random access attempt comprises an indication of whether the beam is the same beam as a previous unsuccessful random access attempt, a beam identifier such as a SSB identifier or a CSI-RS identifier, a reference signal measurement value associated with beam, an amount of time between when the reference signal measurement value associated with beam was measured and when the beam was used for the random access attempt, and/or a reference signal measurement value associated with a neighboring beam.

In particular embodiments, the information about random access resources associated with the beam associated with the random access attempt is stored chronologically in the order that the random access attempt occurred.

According to some embodiments, a network node is capable of reconfiguring random access resources. The network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, compared to the LTE solution where only the total number of random access attempts is logged and possibly reported to the network, particular embodiments enable the UE to provide more insights to the network so that RACH performance at the UE is improved at a next RACH attempt.

Particular embodiments enable the network to figure out the UE decisions, partially based on RACH configurations determined by the network (and e.g. indicated in system information or handover configuration) or measurements that lead to a possibly long delay to complete a RACH performance, because the number of preamble transmissions until success is related to the time it takes for a UE to access a cell.

Similarly, compared to LTE where only a single flag indicates that contention has been detected, particular embodiments enable the UE to provide more insights to the network so that random access performance at the UE is improved at a next random access attempt.

Particular embodiments enable the network to figure out in which beams (e.g., in which SSBs for a given cell) collisions have happened so that the network may adjust parameters per SSB knowing where collisions may be occurring.

In addition, particular embodiments may provide further insights on how beam recovery, beam monitoring and radio link monitoring and beam failure monitoring should be configured after random access (e.g., when the UE is resuming from RRC_INACTIVE, setting up the connection from RRC_IDLE, performing handover (reconfiguration with sync), SCG addition, SCell addition, or any other procedure where random access may be followed by a reconfiguration, in particular in the case CBRA is used in these procedures and contention is happening or responses are timing out. In general, a UE logs and reports information per beam (e.g., SSB and/or CSI-RS), and RACH resources mapped based on that selection, for a collision event (i.e., when the UE detects collision during random access) or any other random access failure.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, certain challenges currently exist with random access reporting when using beam selection. Certain aspects of the present disclosure and their embodiments may provide solutions to these or other challenges. Particular embodiments include enhanced logging and reporting, enabling the network to make better informed resource configurations and allocations.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Particular embodiments include the logging and reporting related to beam selection upon random-access resource selection. A "beam" may be a reference signal that a user equipment (UE) detects. A beam is associated with a beam identifier. For example, with respect to the Third Generation Partnership Project (3GPP) new radio (NR) standard, the reference signal described above may be a synchronization signal and physical broadcast channel (PBCH) block (SSB) or a channel state information reference signal (CSI-RS).

Figure 1:
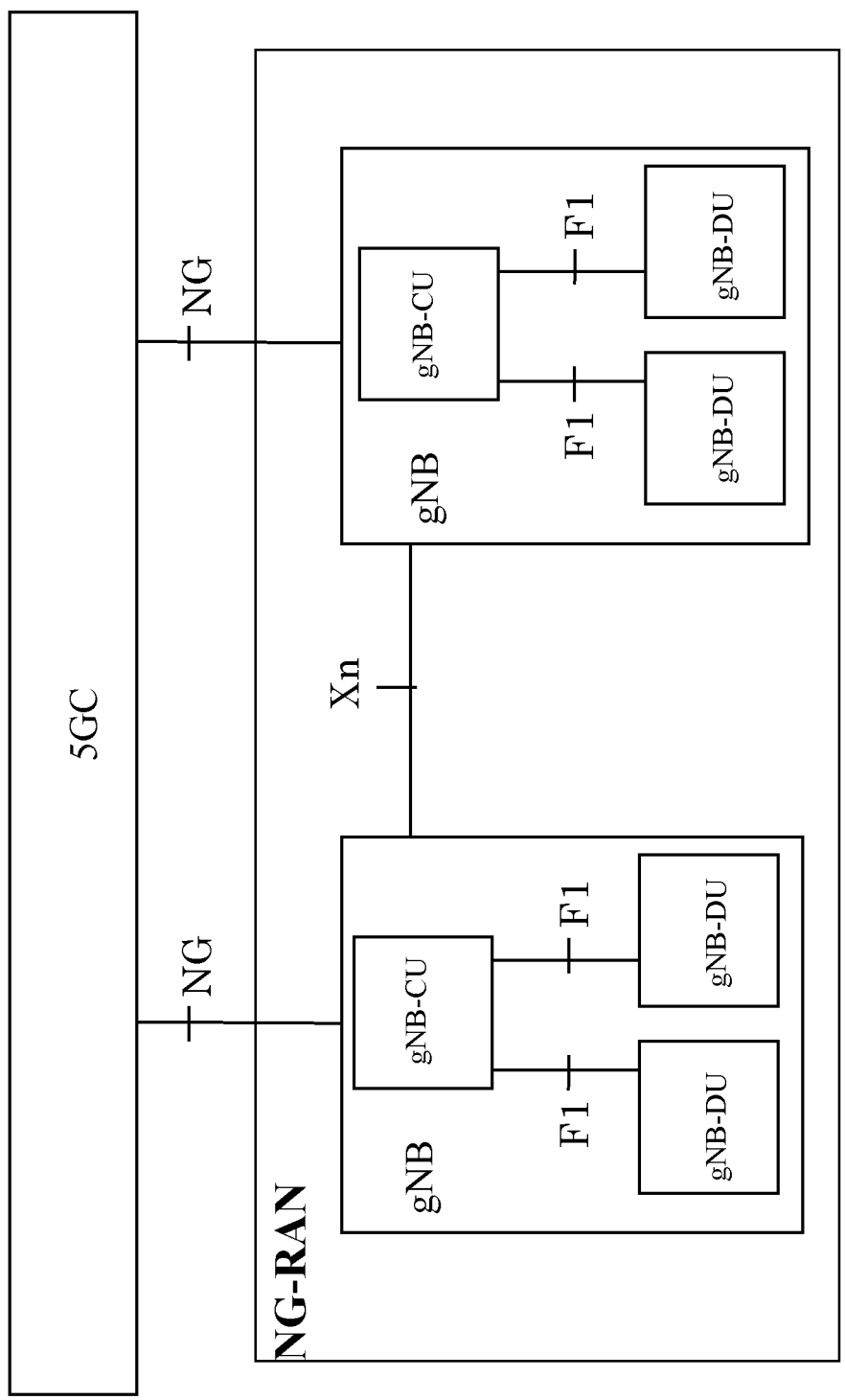
FIG. 1 is a block diagram illustrating the 5G RAN architecture.
Figure 2:
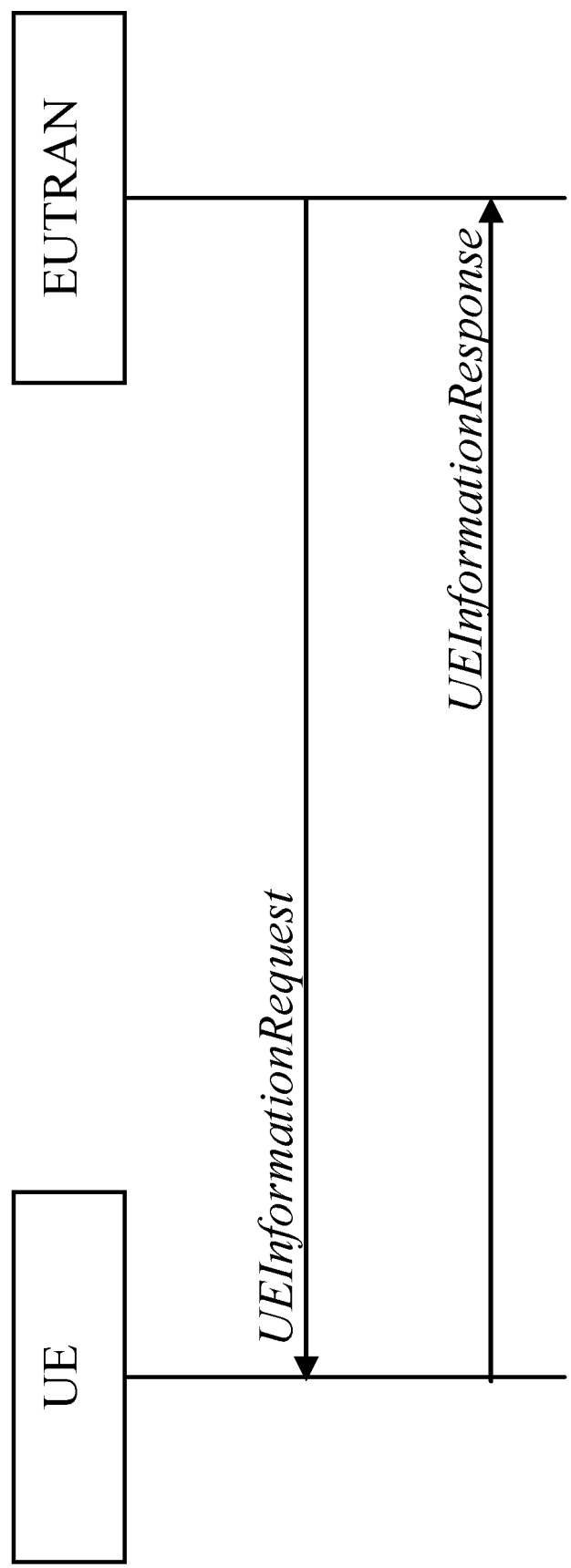
FIG. 2 is a flow diagram illustrating an example UE information procedure.
Figure 3:
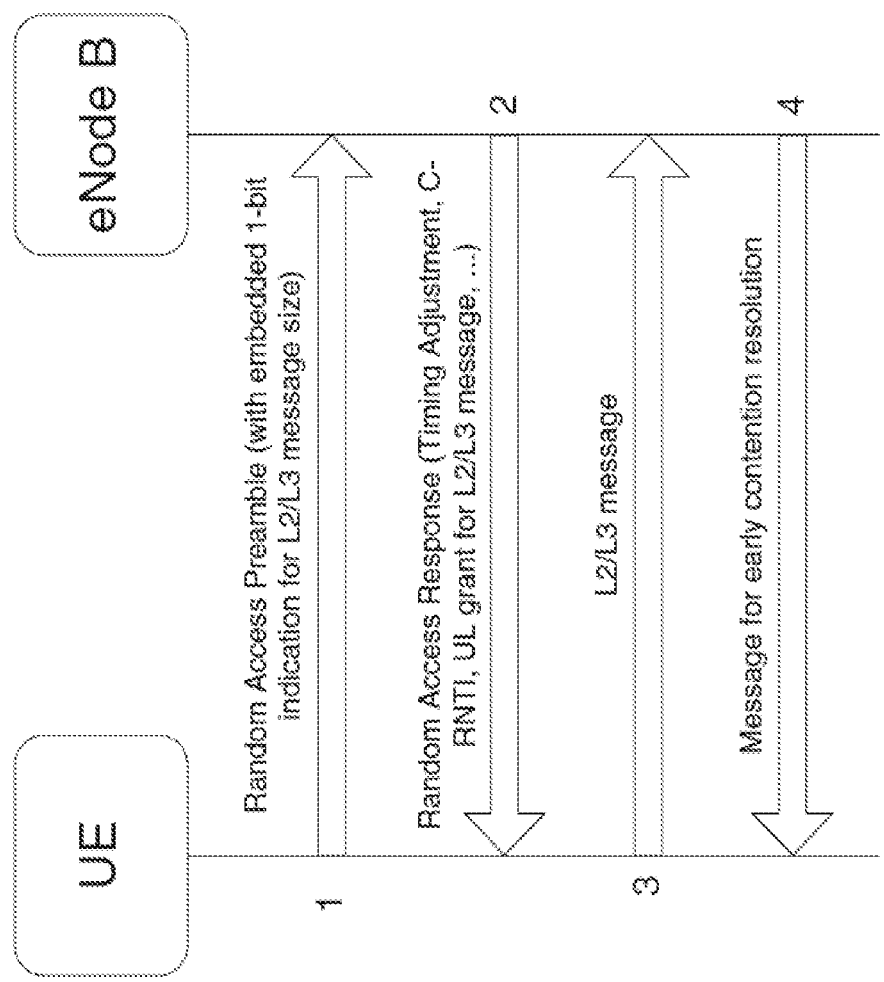
FIG. 3 is a flow diagram illustrating an example contention based random access (CBRA) procedure.
Figure 4:
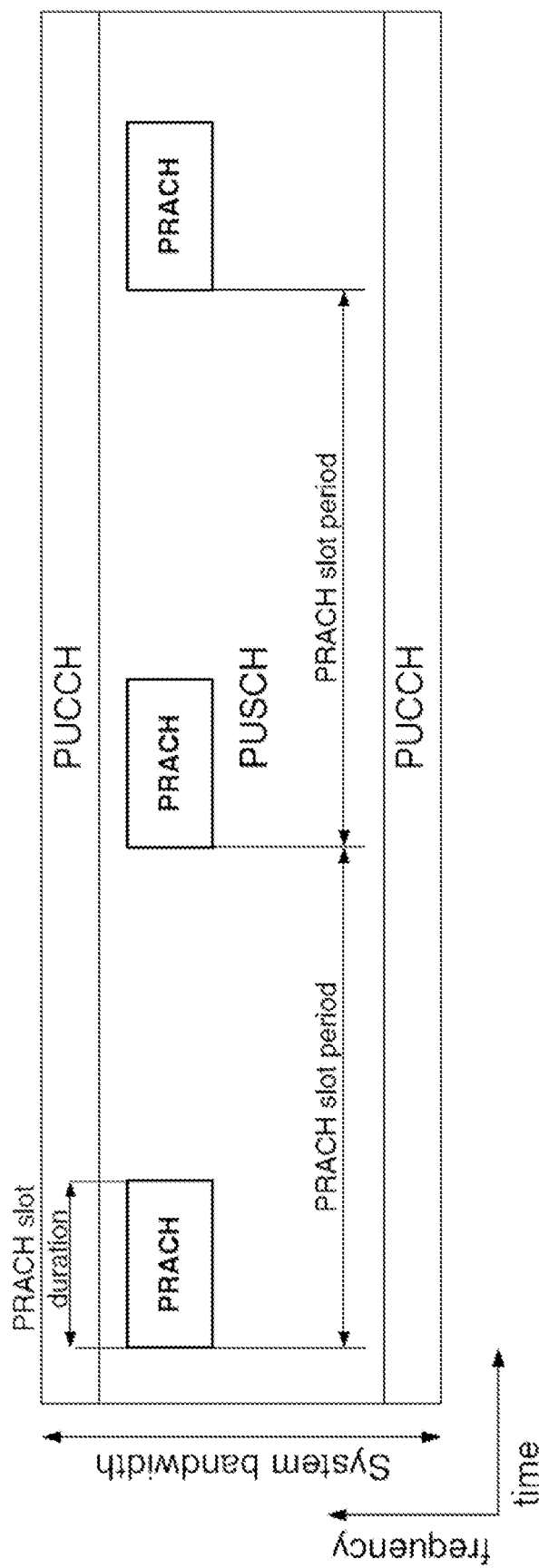
FIG. 4 is a time and frequency diagram illustrating multiplexing of PRACH, PUSCH, and PUCCH.
Figure 5:
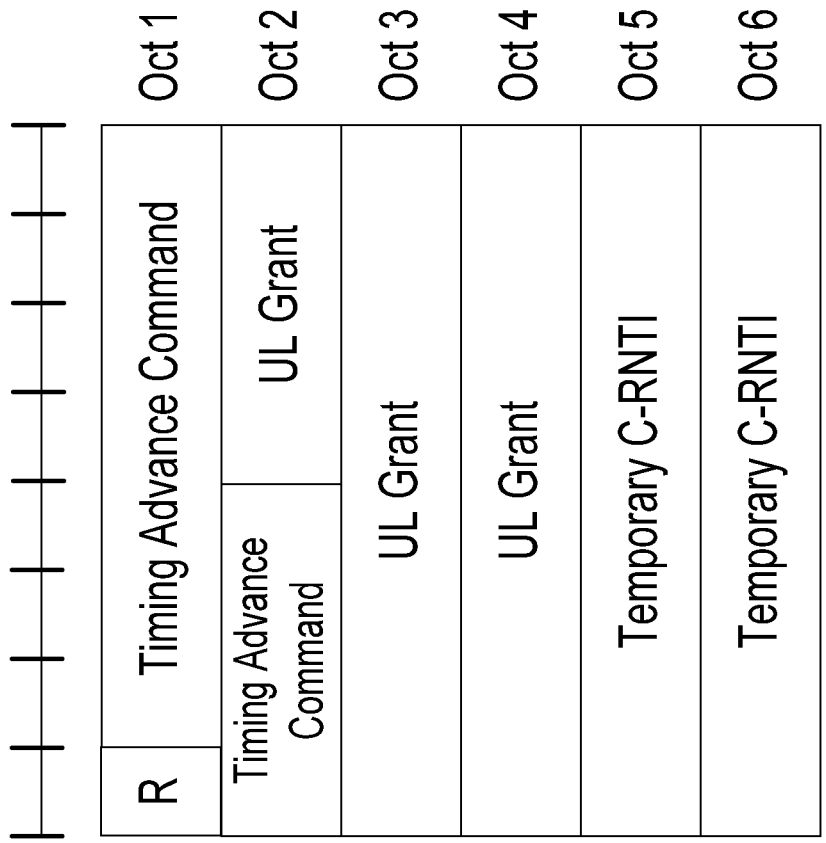
FIG. 5 is a block diagram illustrating the MAC random access response.
Figure 6:
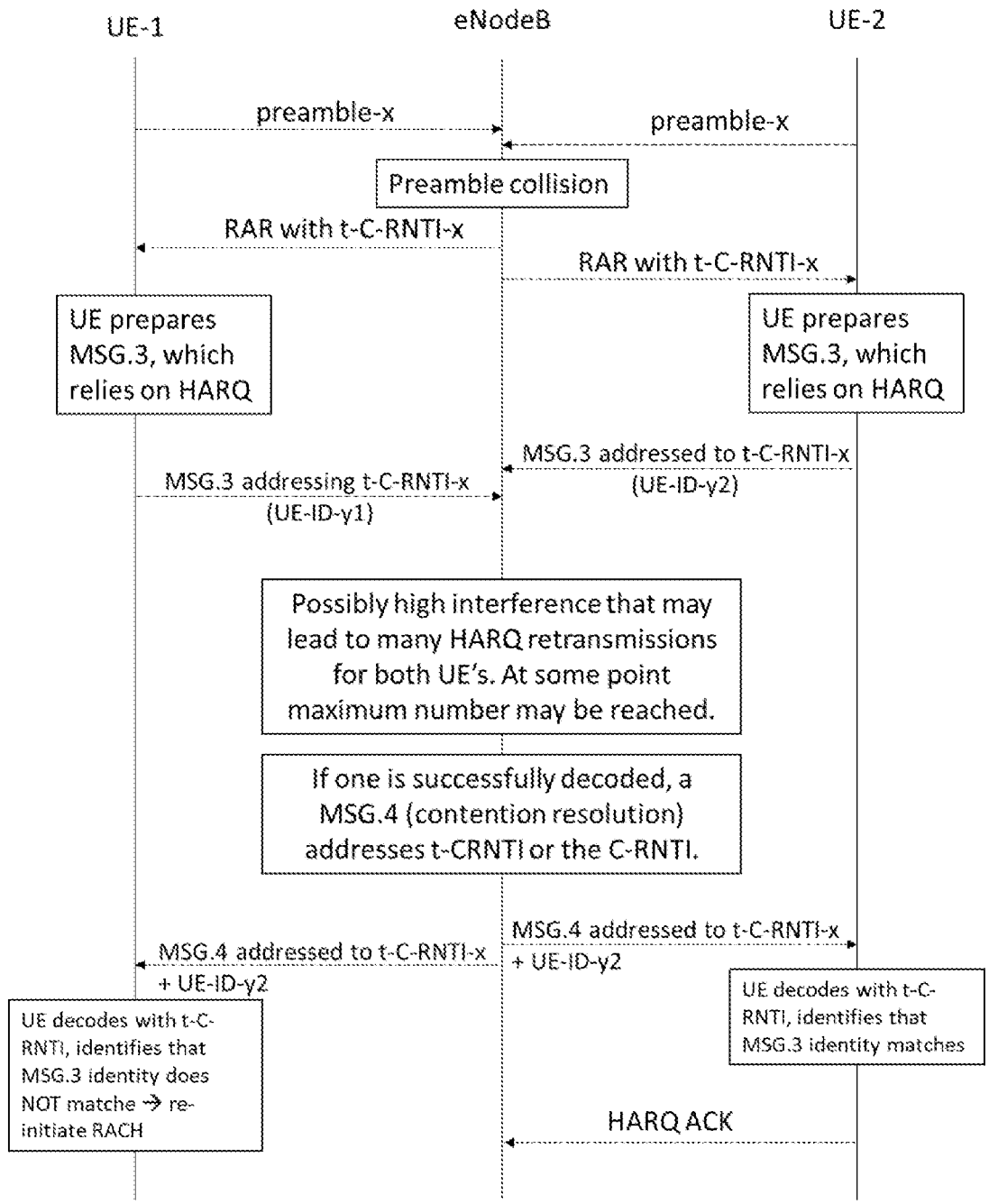
FIG. 6 is a flow diagram illustrating two UEs performing a transition from to idle to connected states with a collision.
Figure 7:
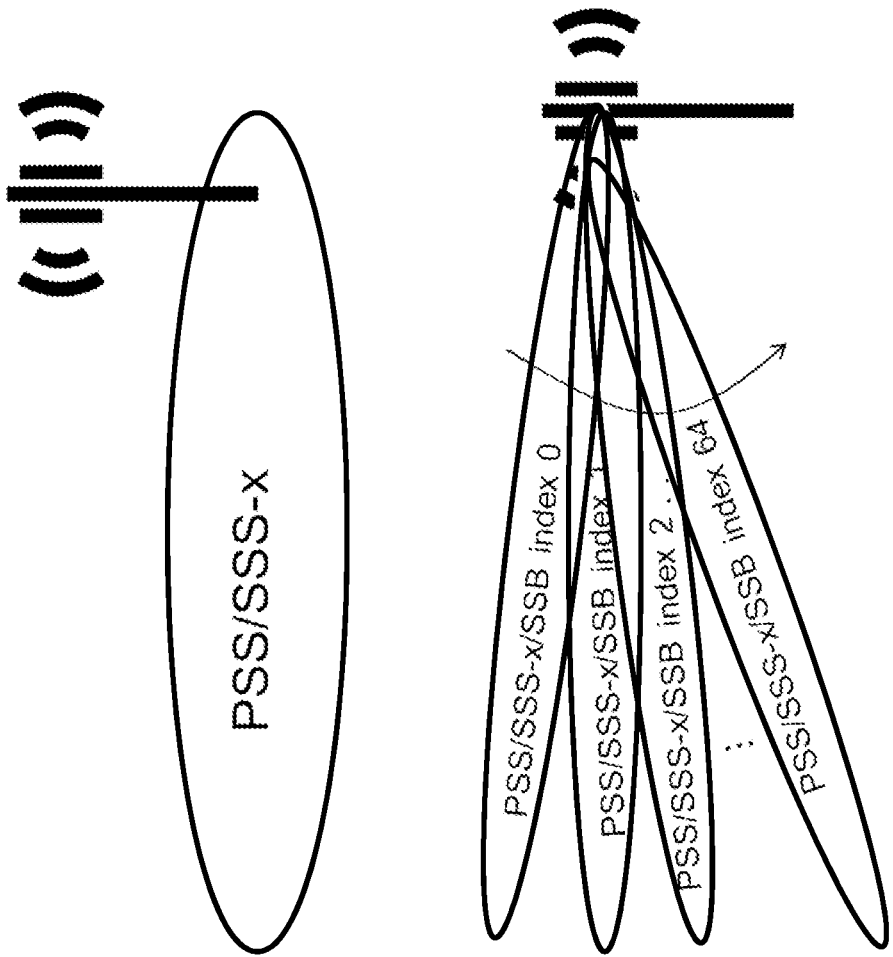
FIG. 7 is a block diagram illustrating two networks, each transmitting SSB.
Figure 8:
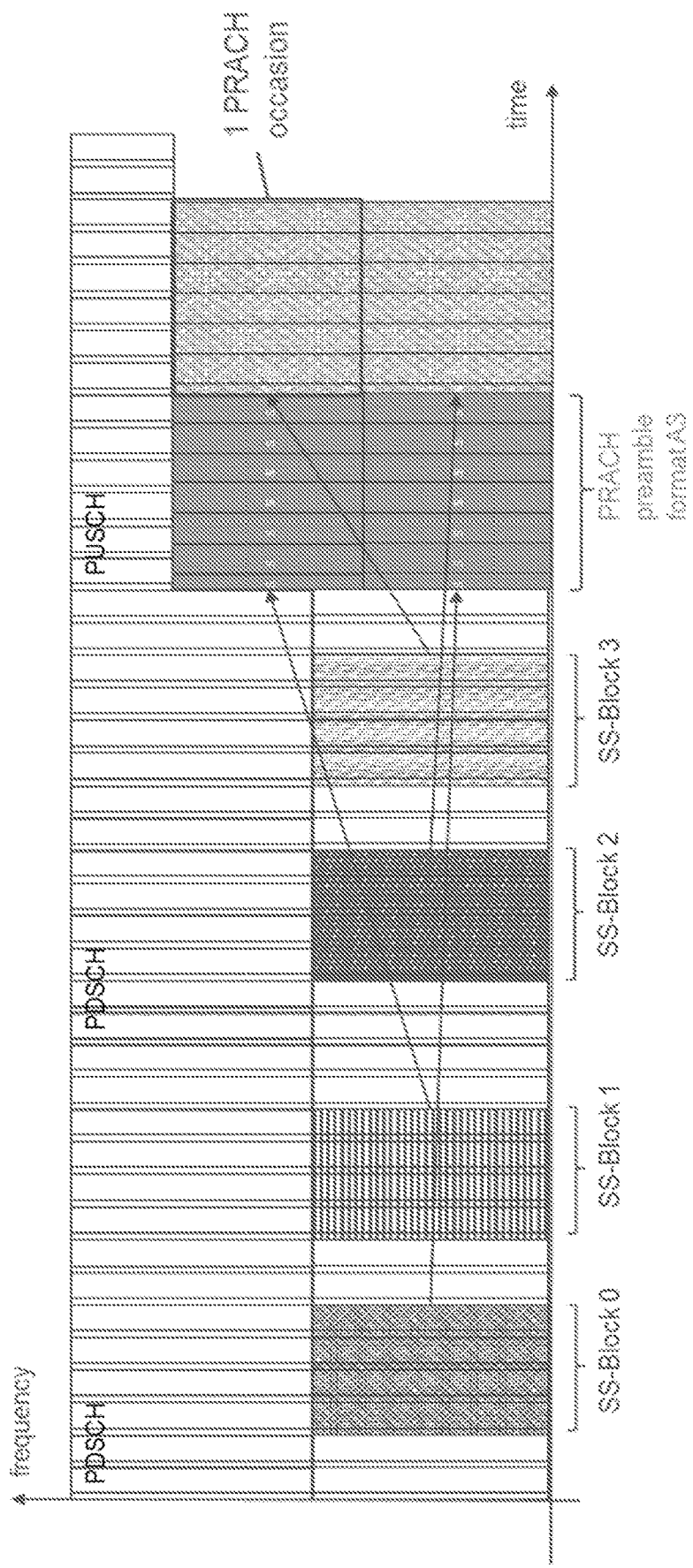
FIG. 8 is a time frequency diagram illustrating SSBs and PRACH occasions.
Figure 9:
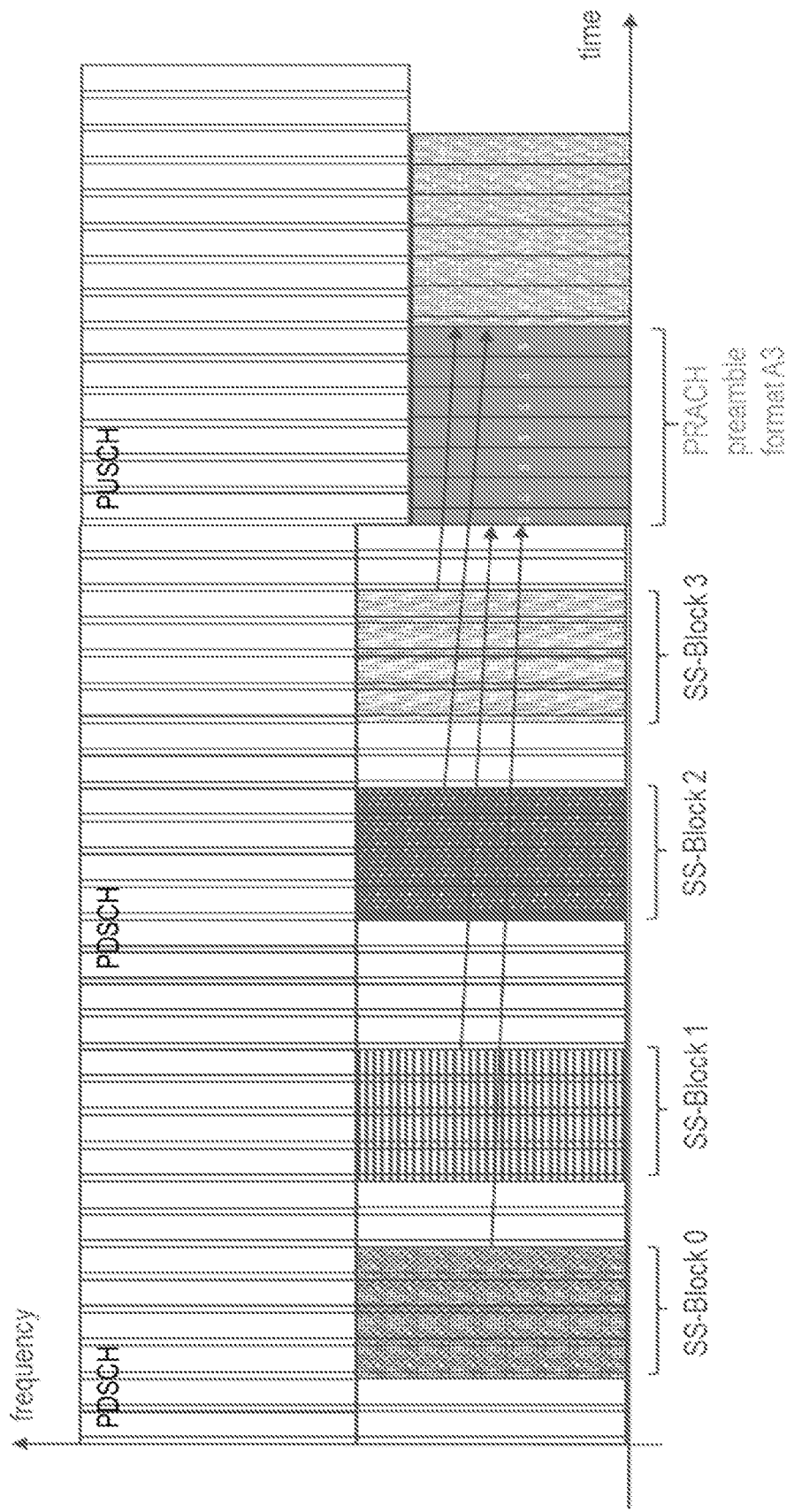
FIG. 9 is another time frequency diagram illustrating SSBs and PRACH occasions.
Figure 10:
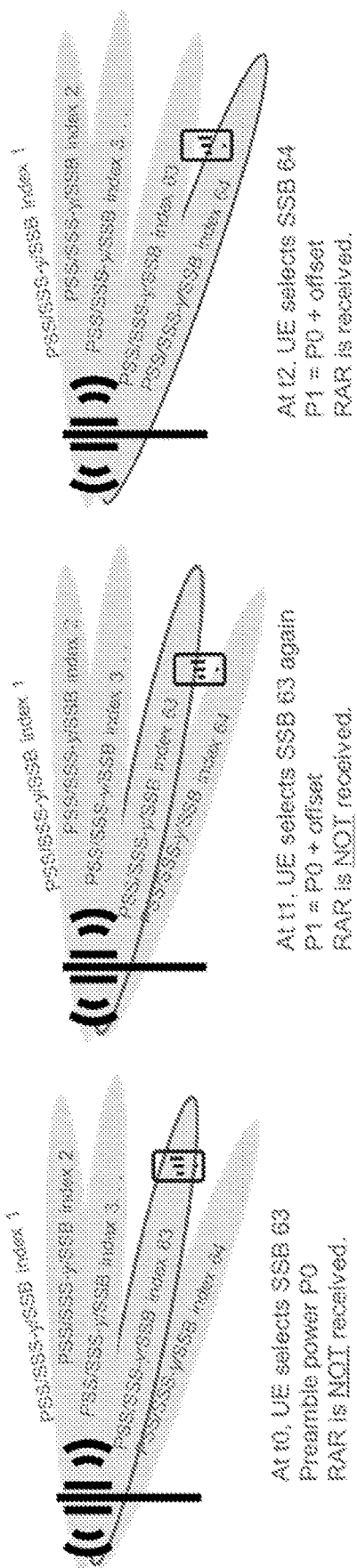
FIG. 10 is a sequence diagram illustrating preamble retransmission with beam reselection.
Figure 11:
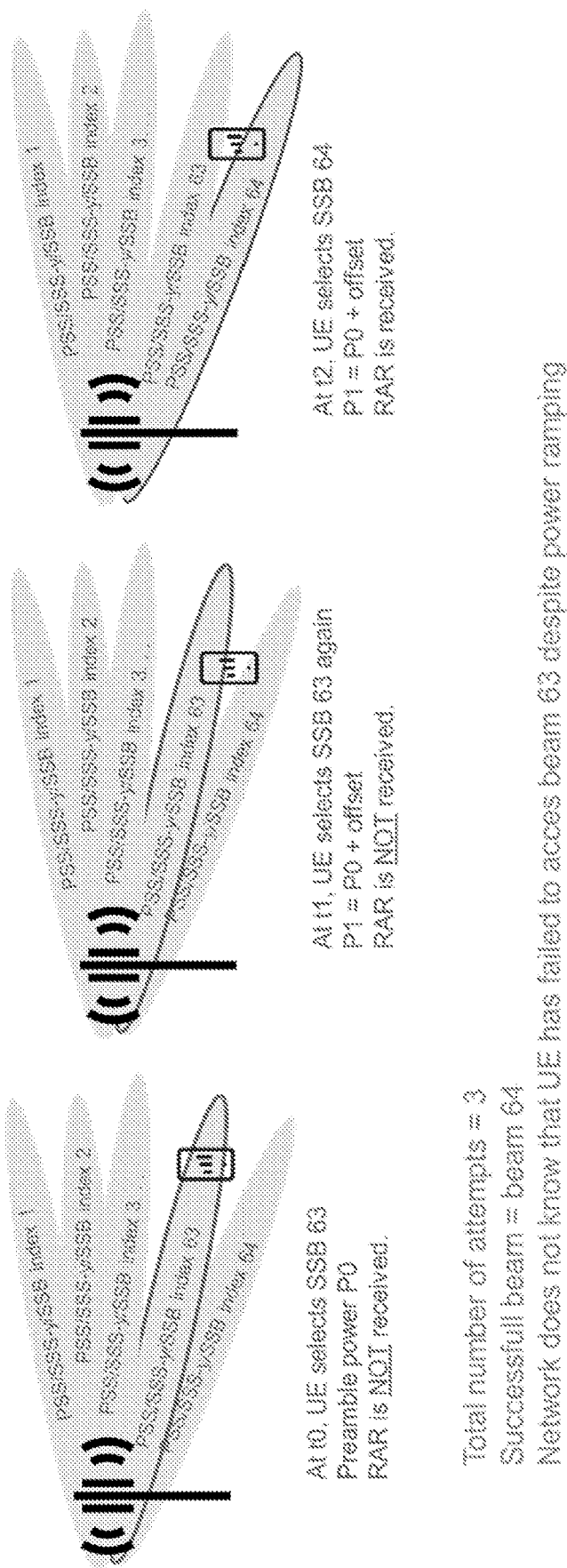
FIG. 11 is a sequence diagram illustrating ambiguities when using preamble retransmission with beam reselection.
Figure 12:
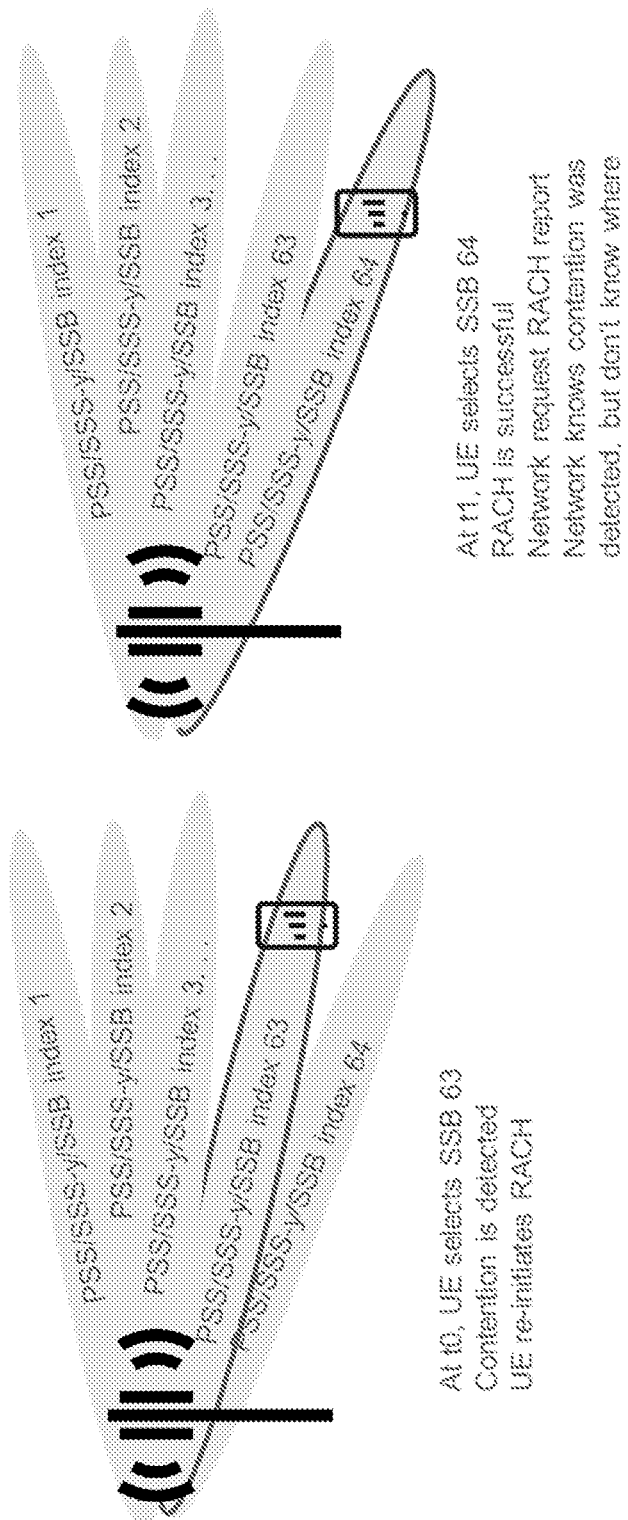
FIG. 12 is a sequence diagram illustrating ambiguities when using contention resolution with beam reselection.
Figure 13:
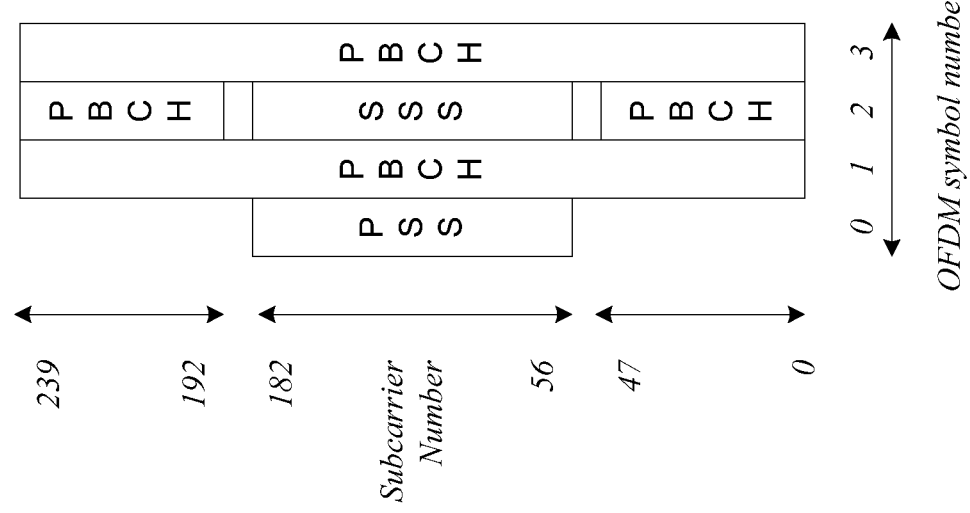
FIG. 13 is a block diagram illustrating an example SSB.

FIG. 13 is a block diagram illustrating an example SSB. An SSB consists of a primary synchronization signal (PSS) and secondary synchronization signals (SSS), each occupying 1 symbol and 127 subcarriers, and PBCH spanning across 3 orthogonal frequency division multiplexing (OFDM) symbols and 240 subcarriers. One symbol includes an unused part in the middle for SSS, as illustrated.

The possible time locations of SSBs within a half-frame are determined by sub-carrier spacing and the periodicity of the half-frames where SSBs are transmitted is configured by the network. During a half-frame, different SSBs may be transmitted in different spatial directions (i.e., using different beams, spanning the coverage area of a cell). Within the frequency span of a carrier, multiple SSBs can be transmitted. The physical cell identifiers (PCIs) of SSBs transmitted in different frequency locations do not have to be unique, i.e. different SSBs in the frequency domain can have different PCIs. However, when an SSB is associated with a remaining minimum system information (RMSI), the SSB corresponds to an individual cell, which has a unique NR cell global identifier (NCGI). Such an SSB is referred to as a cell-defining SSB (CD-SSB). A PCell is always associated to a CD-SSB located on the synchronization raster.

In particular embodiments, a UE logs/stores beam related information such as any of the following information. The UE may log/store a beam identifier of the selected beam(s). If a random access channel (RACH) is SSB based, the beam identifier is a SSB identifier. If the RACH is CSI-RS based, the beam identifier is a CSI-RS identifier.

The UE may log/store radio conditions of the selected beam/beams (e.g., reference symbol receive power (RSRP), reference symbol receive quality (RSRQ), or signal to interference and noise ratio (SINR)). The radio conditions may be ones the UE assumed when it decided to perform beam selection to the same beam or to a different beam upon the RACH preamble transmission attempt failure; alternatively, the radio conditions may be derived from the most up to date measurements of the beam's reference signal (RS) taken by the UE.

In some embodiments, the beam identifier is an SSB index. The SSB index may be derived based on information transmitted in the master information block (MIB) payload and its demodulation reference signals (DM-RS).

In embodiments, the beam identifier is a CSI-RS index. the CSI-RS index may be provided by the network via dedicated signaling associated to a specific CSI-RS resource configuration.

There may be a mapping between beam identifiers as described above and physical random access channel (PRACH) resources where the UE transmits the preamble. The UE may report the beam and/or any other information from which it is possible to derive the PRACH resource(s) where a contention has been detected or where a random access response (RAR) was not received.

For the radio conditions, Layer 1 may receive from higher layers a set of SS/PBCH block indexes (or CS-RS) and provide to higher layers a corresponding set of RSRP, RSRQ and/or SINR measurements. These may be referred to as L1 measurement per SSB, L1 measurement per CSI-RS or L1 measurement per beam.

Some example measurements to be logged and reported are described in the L1 specifications and as reproduced below (for simplicity, only RRSP definitions were provided for CSI-RS and SSB).

One measurement is the SS received signal received power (SS-RSRP). SS-RSRP is defined as the linear average over the power contributions (in [W]) of the resource elements that carry secondary synchronization signals. The measurement time resource(s) for SS-RSRP are confined within SS/PBCH block measurement time configuration (SMTC) window duration. If SS-RSRP is used for L1-RSRP as configured by reporting configurations as defined in 3GPP TS 38.214, the measurement time resources(s) restriction by SMTC window duration is not applicable.

For SS-RSRP determination demodulation reference signals for PBCH and, if indicated by higher layers, CSI reference signals in addition to secondary synchronization signals may be used. SS-RSRP using demodulation reference signal for PBCH or CSI reference signal shall be measured by linear averaging over the power contributions of the resource elements that carry corresponding reference signals taking into account power scaling for the reference signals as defined in 3GPP TS 38.213. If SS-RSRP is not used for L1-RSRP, the additional use of CSI reference signals for SS-RSRP determination is not applicable.

SS-RSRP shall be measured only among the reference signals corresponding to SS/PBCH blocks with the same SS/PBCH block index and the same physical-layer cell identity.

If SS-RSRP is not used for L1-RSRP and higher-layers indicate certain SS/PBCH blocks for performing SS-RSRP measurements, then SS-RSRP is measured only from the indicated set of SS/PBCH block(s).

For frequency range 1, the reference point for the SS-RSRP shall be the antenna connector of the UE. For frequency range 2, SS-RSRP shall be measured based on the combined signal from antenna elements corresponding to a given receiver branch. For frequency range 1 and 2, if receiver diversity is in use by the UE, the reported SS-RSRP value shall not be lower than the corresponding SS-RSRP of any of the individual receiver branches.

The number of resource elements within the measurement period that are used by the UE to determine SS-RSRP is left up to the UE implementation with the limitation that corresponding measurement accuracy requirements have to be fulfilled. That information may also be logged in the RACH report. The power per resource element is determined from the energy received during the useful part of the symbol, excluding the cyclic prefix (CP).

Another measurement is the CSI reference signal received power (CSI-RSRP). CSI-RSRP is defined as the linear average over the power contributions (in [W]) of the resource elements of the antenna port(s) that carry CSI reference signals configured for RSRP measurements within the considered measurement frequency bandwidth in the configured CSI-RS occasions.

For CSI-RSRP determination CSI reference signals transmitted on antenna port 3000 according to 3GPP TS 38.211 shall be used. If CSI-RSRP is used for L1-RSRP, CSI reference signals transmitted on antenna ports 3000, 3001 can be used for CSI-RSRP determination.

For intra-frequency CSI-RSRP measurements, if the measurement gap is not configured, UE is not expected to measure the CSI-RS resource(s) outside of the active downlink bandwidth part.

For frequency range 1, the reference point for the CSI-RSRP shall be the antenna connector of the UE. For frequency range 2, CSI-RSRP shall be measured based on the combined signal from antenna elements corresponding to a given receiver branch. For frequency range 1 and 2, if receiver diversity is in use by the UE, the reported CSI-RSRP value shall not be lower than the corresponding CSI-RSRP of any of the individual receiver branches.

The number of resource elements within the considered measurement frequency bandwidth and within the measurement period that are used by the UE to determine CSI-RSRP is left up to the UE implementation with the limitation that corresponding measurement accuracy requirements have to be fulfilled. That information may also be logged in the RACH report. The power per resource element is determined from the energy received during the useful part of the symbol, excluding the CP.

Figure 14:
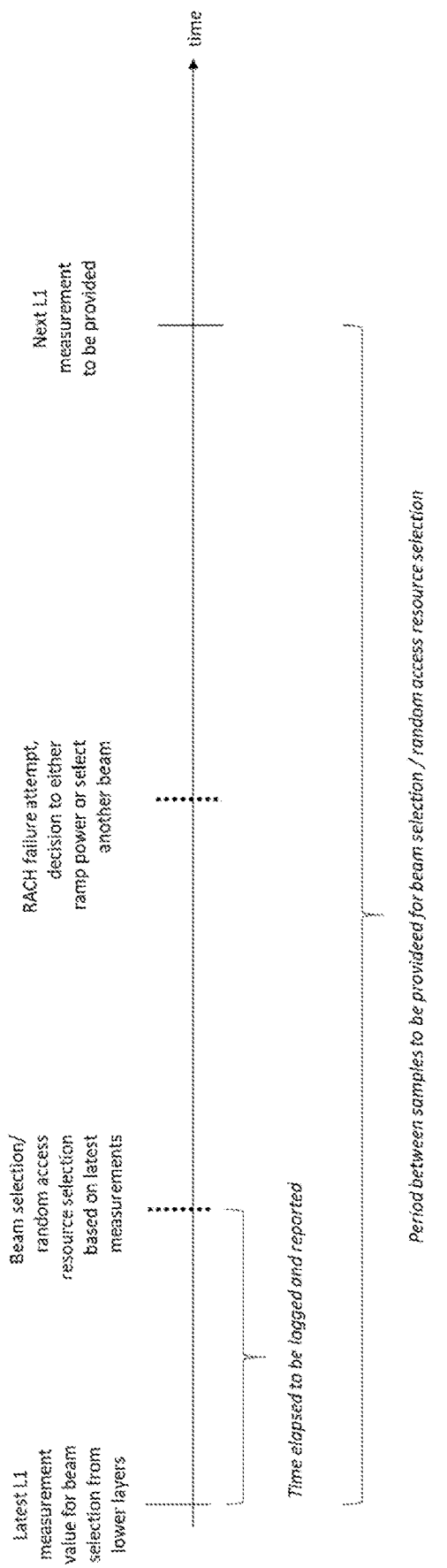
FIG. 14 is a timeline illustrating the time elapsed between obtaining measurements and beam selection.

In some embodiments, the UE logs and reports the time elapsed since the latest measurement sample the UE took before it selected the beam (i.e., time information enabling the network to determine how up to date are the measurements the UE used to make the decision on selecting a particular beam; or, in the case of retransmission, to make the decision between selecting a new beam or selecting the same beam). An example is illustrated in FIG. 14, which is a timeline illustrating the time elapsed between obtaining measurements and beam selection.

In some embodiments, a UE may log its measurement update rate (i.e., how often it updates the measurements for beam selection).

Particular embodiments include signaling of measurements among radio access network (RAN) nodes. The measurements described herein may be collected in a RACH Report. The RACH Report is the set of measurements described herein and reported at the radio resource control (RRC) level.

In a split RAN architecture, the RACH Report is signaled by the UE to the gNB-Central Unit (gNB-CU), which is the node hosting the RRC protocol. However, RACH configurations and RACH access is performed at the gNB-DU.

With the information reported over RRC to the gNB-CU, the gNB-CU may be able to detect RACH configuration problems at one or more gNB-DU. Such problems may be divided in two kinds.

A first type of problem arises from sub-optimal RACH configuration at the gNB-DU. These are problems that can be resolved by changing the gNB-DU RACH configuration in isolation, without impacting other neighboring gNB-DUs.

A second type of problem arises from sub-optimal RACH configuration across gNB-DUs. These are problems that require inter gNB-DU coordination. For example, inter gNB-DU coordination may be needed where RACH resources between beams of different gNB-DUs overlap.

For the first type of problem, the gNB-CU may signal to the gNB-DU an indication that a reconfiguration of RACH parameters is needed. Such indication may be generic, or it may be specific. For example, the gNB-CU may specify to the gNB-DU that an increase in the number of preambles used for a given beam is needed. The latter may be due to a high number of UEs attempting RACH access to the gNB-DU, with a resulting high rate of RACH failures/contention.

The gNB-CU may specify the parameters that needs to be reconfigured and it may also suggest new values for such parameters. For example, the gNB-DU may suggest a different maximum number of RACH attempts. The latter may be due either to the fact that, with the current maximum number of attempts the UE is not able to be heard by the gNB-DU or it might be due to the fact that the power used by the UE when nearing the maximum number of attempts is too high and causes interference to neighboring nodes, in which case a lower maximum number of attempts may be selected.

Alternatively, the gNB-CU may include one or more RACH Reports, or it may create an aggregated version (e.g., by averaging) of the received RACH reports concerning access to the beams of the gNB-DU in question, and send such information to the gNB-DU. By receiving the RACH Report information, the gNB-DU is aware that a RACH reconfiguration is needed, and it may be able to understand what such reconfiguration should consist of, either based on the indication from the gNB-CU or based on analyzing the RACH Report received.

For the second type of problem, the gNB-CU analyzes all the information collected for RACH accesses to beams hosted by connected gNB-DUs and derives a corrective action for multiple gNB-DUs. It is assumed that the gNB-CU is aware of and up to date with the RACH configuration per beam of each connected gNB-DU. The gNB-CU may then issue a command to concerned gNB-DUs to modify their RACH configuration in a specific manner. Such modification resulting in coordination of RACH configuration across gNB-DUs and resolution of the issue originally detected by the gNB-CU.

As an example, the gNB-CU may realize that the RACH resources used by neighboring gNB-DUs are in part or in full overlapping. The gNB-CU may then signal concerned gNB-DUs with either a new RACH resource reconfiguration, i.e. signaling the specific parameters that the gNB-DU shall change in its configuration, or it may signal to the gNB-DU of concern the RACH configuration of its neighboring gNB-DUs. Such signaling may possibly be complemented with an indication that a RACH resource reconfiguration is needed. The gNB-DU may then be able to check RACH resource configuration of all its neighbor gNB-DUs and reconfigure its RACH resources so that no clashes with neighbor nodes occur.

Figure 15:
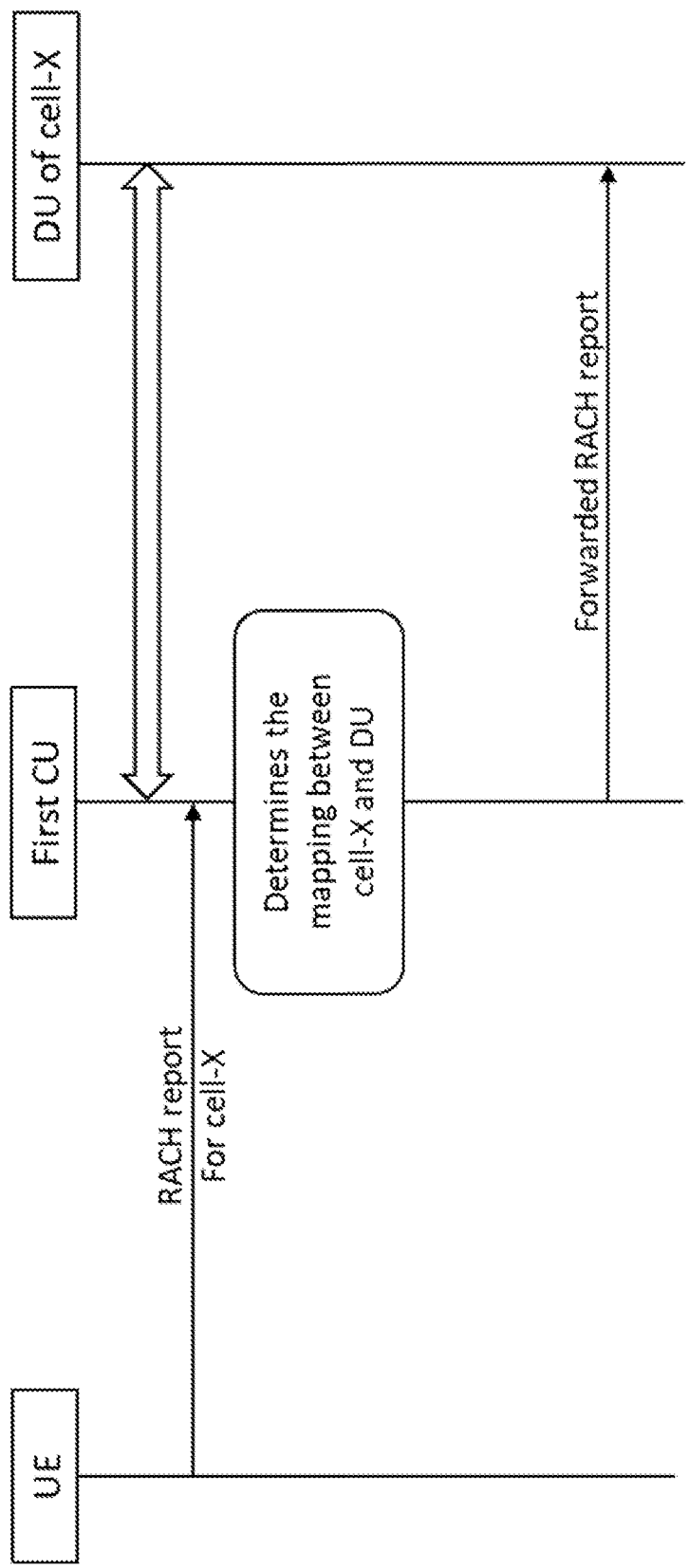
FIG. 15 is a flow diagram illustrating a gNB-CU distributing a RACH report to a gNB-DU.

The above actions taken by the gNB-CU and gNB-DU may be taken between two RAN nodes, for example two gNBs or one gNB and one eNB, where the first node is an NR gNB split in gNB-CU and gNB-DU. The first node's gNB-CU may signal to the neighbor RAN node the information described above for the resolution of the two classes of problems. Similar to the gNB-DU case the neighbor RAN node may be given freedom to address the issue in the best way fitting its implementation or it might be given specific commands to change a given RACH configuration. FIG. 15 is a flow diagram illustrating a gNB-CU distributing a RACH report to a gNB-DU.

Particular embodiments include a method at a wireless terminal (e.g., UE). The method comprises, after the transmission of a RACH preamble and the initiation of a timer for the RAR time window:

Upon each attempt to transmit RACH preamble, logging/storing information of the beam selection procedure (e.g., SSB or CSI-RS), such as:

Beam identifier of the selected beam(s); If an SSB based RACH, the SSB identifier. If a CSI-RS based RACH, a CSI-RS identifier;

Radio conditions of the selected beam/beams (e.g., RSRP, RSRQ, or SINR);

Time elapsed since the latest measurement sample the UE took before it selected the beam (i.e., time information enabling the network to determine how up to date were the measurements the UE used to make the decision on selecting a particular beam; or, in the case of retransmission, to make the decision between selecting a new beam or selecting the same beam;

Similar information as above (radio conditions, time elapsed, beam identifier, etc.) for neighbor beams in the same cell the UE is performing RACH;

Similar information as above (radio conditions, time elapsed, beam identifier, etc.) for neighbor beams in neighbor cells i.e. not the cell the UE is performing RACH;

The logging indicated above for beam selection procedure may also be for the random-access resource selection where the selected SSB(s)/CSI-RS(s) maps to at least one random access resource.

Reporting to the network logged/stored information related to the beam selection procedure/random-access resource selection described above i.e. report for select SSB and/or CSI-RS at least one of the following:

Beam identifier of the selected beam(s); If an SSB based RACH, the SSB identifier. If a CSI-RS based RACH, a CSI-RS identifier;

Radio conditions of the selected beam/beams (e.g., RSRP, RSRQ, or SINR);

Time elapsed since the latest measurement sample the UE took before it selected the beam (i.e., time information enabling the network to determine how up to date were the measurements the UE used to make the decision between selecting a new beam or selecting the same beam;

Similar information as above (radio conditions, time elapsed, beam identifier, etc.) for neighbor beams in the same cell the UE is performing RACH;

Similar information as above (radio conditions, time elapsed, beam identifier, etc.) for neighbor beams in neighbor cells i.e. not the cell the UE is performing RACH;

The logging indicated above for beam selection procedure may also be for the random-access resource selection where the selected SSB(s)/CSI-RS(s) maps to at least one random access resource;

In some embodiments, the information is included in a RACH report. The report may be transmitted upon request by the network e.g. with an UEInformationRequest message; the RACH report may be included in a UEInformationResponse message;

In some embodiments, the information above is only logged (and possibly reported in a RACH report) when the first RACH preamble transmission attempt is not successful. One reason is that if the first attempt is successful, then the network knows more about what happened in the procedure e.g. first and last selected beam, no usage of ramping, etc. Thus, these embodiments may be described as follows:

For each failed RACH preamble transmission attempt, i.e., upon the expiry of the RAR timer and detecting that a response was not received for a given preamble transmission/RACH resource selection, logging/storing the UE decision upon RACH attempt failure:

Select a different beam (e.g., SSB or CSI-RS) compared to the previous transmission that was not successful or;

Select the same beam (e.g., SSB or CSI-RS) compared to the previous transmission that was not successful or;

For each failed RACH preamble transmission attempt, i.e., upon the expiry of the RAR timer and detecting that a response was not received for a given preamble transmission/RACH resource selection, logging/storing more detailed information related to the decision to select the same beam (e.g., SSB or CSI-RS) as in the previous preamble transmission and to ramp/increase the preamble transmission power (where that is increased having as reference the power of the previously transmitted preamble);

Beam identifier of the selected beam(s); If an SSB based RACH, the SSB identifier. If a CSI-RS based RACH, a CSI-RS identifier;

Radio conditions of the selected beam/beams (e.g. RSRP, RSRQ, or SINR). These radio conditions may be the ones the UE has assumed when it has decided to perform beam selection to the same beam or to a different beam upon the RACH preamble transmission attempt failure;

Time elapsed since the latest measurement sample the UE took before it selected the beam (i.e., time information enabling the network to determine how up to date were the measurements the UE used to make the decision between selecting a new beam or selecting the same beam;

Similar information as above (radio conditions, time elapsed, beam identifier, etc.) for neighbor beams in the same cell the UE is performing RACH;

Similar information as above (radio conditions, time elapsed, beam identifier, etc.) for neighbor beams in neighbor cells i.e. not the cell the UE is performing RACH;

The logging indicated above for beam selection procedure may also be for the random-access resource selection where the selected SSB(s)/CSI-RS(s) maps to at least one random access resource.

For each failed RACH preamble transmission attempt, i.e., upon the expiry of the RAR timer and detecting that a response was not received for a given preamble transmission, logging/storing information related to the decision to select a different beam (e.g., SSB or CSI-RS) compared to the previous preamble transmission/

RACH resource selection and, consequently, the decision to not ramp/increase the preamble transmission power (i.e., transmit the preamble with same power of the previously transmitted preamble);
- Beam identifier of the selected beam(s); If an SSB based RACH, the SSB identifier. If a CSI-RS based RACH, a CSI-RS identifier;
- Radio conditions of the selected beam/beams (e.g. RSRP, RSRQ, or SINR). These radio conditions may be the ones the UE has assumed when it has decided to perform beam selection to the same beam or to a different beam upon the RACH preamble transmission attempt failure;
- Time elapsed since the latest measurement sample the UE took before it selected the beam (i.e., time information enabling the network to determine how up to date were the measurements the UE used to make the decision between selecting a new beam or selecting the same beam;
- Similar information as above (radio conditions, time elapsed, beam identifier, etc.) for neighbor beams in the same cell the UE is performing RACH;
- Similar information as above (radio conditions, time elapsed, beam identifier, etc.) for neighbor beams in neighbor cells i.e. not the cell the UE is performing RACH;
- The logging indicated above for beam selection procedure may also be for the random-access resource selection where the selected SSB(s)/CSI-RS(s) maps to at least one random access resource.

For each failed RACH preamble transmission attempt, i.e., upon the expiry of the RAR timer and detecting that a response was not received for a given preamble transmission/RACH resource selection, reporting to the network logged/stored information related to at least one decision to select the same beam (e.g., SSB or CSI-RS) as in the previous preamble transmission and to ramp/increase the preamble transmission power (where that is increased having as reference the power of the previously transmitted preamble);
- In some embodiments, the information is included in a RACH report e.g. transmitted in a UEInformationResponse message. The report may be transmitted upon request by the network e.g. request is a flag for RACH report in a UEInformationRequest message;
- There may be a flag for the whole RACH report or for parts of information e.g. more detailed RACH report;
- The information in the RACH report consists of any of the information logged as described in the previous steps;

For each failed RACH preamble transmission attempt, i.e., upon the expiry of the RAR timer and detecting that a response was not received for a given preamble transmission, reporting to the network logged/stored information related to the decision to select a different beam (e.g., SSB or CSI-RS) compared to the previous preamble transmission/RACH resource selection and, consequently, the decision to not ramp/increase the preamble transmission power (i.e., transmit the preamble with same power of the previously transmitted preamble);
- In some embodiments, the information is included in a RACH report e.g. transmitted in a UEInformationResponse message. That may be transmitted upon request by the network e.g. request is a flag for RACH report in a UEInformationRequest message;
- There may be a flag for the whole RACH report or for parts of information e.g. more detailed RACH report.
- The information in the RACH report consists of any of the information logged as described in the previous steps;

Particular embodiments include another method at a wireless terminal (e.g., UE). The method comprises detecting a collision event during a random access procedure performed upon the selection of a random-access resource mapped to a selected beam (e.g., SSB or CSI-RS) in the cell the UE is performing random access. Detecting the collision event refers to the detection of a not successful contention resolution, which may also be referred to as detection of contention or contention detected.

The event leading to the detection may be at least one of the following events, according to current specifications. Contention is detected after transmitting a Message 3 using a cell radio network temporary identifier (C-RNTI) assigned by target cell (e.g., in handover or when UE is in RRC_CONNECTED), the UE detects a Message 4 not addressing its C-RNTI, and the contention resolution timer expires.

Contention is detected after transmitting a Message 3 using a C-RNTI assigned by a target cell (e.g., in handover or when UE is in RRC_CONNECTED), the contention resolution timer expires even without the UE receiving a Message 4.

Contention is detected after transmitting a Message 3 using a temporary cell radio network temporary identifier (TC-RNTI) assigned to it in the RAR and the UE detects a Message 4 addressing the same TC-RNTI but the UE Identity in the Message 4 payload does not match the UE's identity transmitted on Message 3.

Contention is detected upon expiry of the contention resolution timer, or upon any other event described above where the UE declares contention occurred.

The method further comprises logging/storing for a collision event information related to the selection of a random-access resource mapped to a selected beam (e.g., SSB or CSI-RS) in the cell that the UE is performing random access where the collision has been detected.

In particular embodiments, the information may comprise any of the following:
- Beam identifier of the selected beam(s); If an SSB based RACH, the SSB identifier. If a CSI-RS based RACH, a CSI-RS identifier;
- Radio conditions of the selected beam/beams (e.g. RSRP, RSRQ, or SINR);
- Time elapsed since the latest measurement sample the UE took before it selected the beam (i.e., time information enabling the network to determine how up to date were the measurements the UE used to make the decision on selecting a particular beam; or, in the case of retransmission, to make the decision between selecting a new beam or selecting the same beam;
- Similar information as above (radio conditions, time elapsed, beam identifier, etc.) for neighbor beams in the same cell the UE is performing RACH;
- Similar information as above (radio conditions, time elapsed, beam identifier, etc.) for neighbor beams in neighbor cells i.e. not the cell the UE is performing RACH;
- The logging indicated above for beam selection procedure may also be for the random-access resource selection where the selected SSB(s)/CSI-RS(s) maps to at least one random access resource.

The method further comprises reporting to the network logged/stored information for a collision event related to the selection of a random-access resource mapped to a selected beam (e.g., SSB or CSI-RS), such as:

- Beam identifier of the selected beam(s); If an SSB based RACH, the SSB identifier. If a CSI-RS based RACH, a CSI-RS identifier;
- Radio conditions of the selected beam/beams (e.g. RSRP, RSRQ, or SINR);
- Time elapsed since the latest measurement sample the UE took before it selected the beam (i.e., time information enabling the network to determine how up to date were the measurements the UE used to make the decision on selecting a particular beam; or, in the case of retransmission, to make the decision between selecting a new beam or selecting the same beam;
- Similar information as above (radio conditions, time elapsed, beam identifier, etc.) for neighbor beams in the same cell the UE is performing RACH;
- Similar information as above (radio conditions, time elapsed, beam identifier, etc.) for neighbor beams in neighbor cells i.e. not the cell the UE is performing RACH;
- The logging indicated above for beam selection procedure may also be for the random-access resource selection where the selected SSB(s)/CSI-RS(s) maps to at least one random access resource.

Particular embodiments include a method at a network (e.g. a radio network node, such as a gNodeB). The method comprises modifying at least on RACH parameter in RACH configuration, such as: a mapping between beams and RACH resources; initial power for preamble transmission; maximum number of attempts; and/or a threshold for beam selection. The method may further comprise informing neighbor nodes of updated RACH configurations.

Particular embodiments may be implemented in an RRC specification by specifying a RACH report containing at least some of the above described information. For simplicity, the example implementation below for the report of RACH information is limited to the cell the UE is accessing, i.e., it does not include information for neighbor cells, like the beam measurement of neighbor cells also described above. The RACH report may be included in an UEInformationResponse message, as follows.

A UE uses the UEInformationResponse message to transfer the information requested by the NG-RAN.

Signalling radio bearer: SRB1 or SRB2 (when logged measurement information is included)
RLC-SAP: AM
Logical channel: DCCH
Direction: UE to NG-RAN UEInformationResponse Message

```
-- ASN1START
UEInformationResponse-r9  ::=                          SEQUENCE {
    rrc-TransactionIdentifier                          RRC-
TransactionIdentifier,
        criticalExtensions                             CHOICE {
            ueInformationResponse-r16
            UEInformationResponse-r16,
                criticalExtensionsFuture               SEQUENCE { }
        }
}
UEInformationResponse-r16-IEs  ::=                     SEQUENCE {
    rach-Report-r16
    SEQUENCE {
        numberOfPreamblesSent-r16
    NumberOfPreamblesSent-r16,
        rachResourceSelectionHistory-r16
    RachResourceSelectionHistory-r16
    }
                                    OPTIONAL,
// other information omitted
        nonCriticalExtension                           SEQUENCE{ }
                                    OPTIONAL
}
RachResourceSelectionHistory::=                        SEQUENCE
(SIZE(1..maxNumberPreambleRetransmissions))                    OF
RachResourceSelectionEvent
RachResourceSelectionEvent    ::=                      SEQUENCE {
    selectedResource                                   CHOICE {
        ssb
        SSBInfo,
        csi-RS                                         CSI-RS-
Info
    }
    ...
}
SSBInfo ::=                       SEQUENCE {
    ssb-Index                     SSB-Index,
    ssb-Results                   MeasQuantityResults,
    timeElapsed                                    ,
    ...
}
CSI-RS-Info ::=                   SEQUENCE {
    csi-RS-Index                  NZP-CSI-RS-ResourceId,
    csi-RS-Results                MeasQuantityResults,
    timeElapsed                                        TimeElapsed,
    ...
}
```

```
MeasQuantityResults ::=            SEQUENCE {
    rsrp                               RSRP-Range    OPTIONAL,
    rsrq                               RSRQ-Range    OPTIONAL,
    sinr                               SINR-Range    OPTIONAL
}
```

In some embodiments, the order of the list may determine the order the events occur i.e. the first element in the first refers to the first RACH preamble transmission attempt.

Some embodiments include further enhanced reporting for multiple RA transmissions within one RAR window duration. For example, based on the current NR specification, the UE is not allowed to perform more than one RA procedure at any point in time in a MAC entity. However, future releases may support multiple RA transmissions within one RAR window duration. In such a scenario, the UE may include how many times the UE changed its beams within one beam sweeping period and what preambles the UE used in the RACH report. In addition, the UE may include the power used for the RA transmissions in these RACH resources.

The network may use the RACH report for network optimization. As one example, the network may use the RACH report as an input for coverage and capacity optimization (CCO). For CCO, the UE may log further information in addition to what has been described above. For example, the use may log and report the RSRP or the beam's RS where RACH access is attempted. This enables the RAN to understand possible uplink/downlink coverage disparity when compared with the RACH access measurements.

The UE may log and report information about beams where the RACH access was successful and where it was not successful. The success information may be obvious to the serving RAN, but if the RACH report is sent to other nodes to help them understand the serving RAN coverage status, then the success information may be helpful. Some embodiments may list the beams accessed (together with RACH access attempts) in order of access and specify that the last list entry is the one where RACH access succeeded, unless a maximum number of retransmission occurred.

If the maximum number of retransmissions occurred, then either the UE managed to successfully access at the last possible attempt, which is an indication of successful access that is logged and reported, or the UE did not manage to access at the last possible attempt, which is an indication of unsuccessful access that is logged and reported.

As another example of optimization, the network may use the RACH report for RACH optimization. RACH parameters may be optimized based on the information included in RACH reports. The parameters for optimization may be at least one of the parameters broadcasted in system information and/or provided in dedicated signaling e.g. in handovers.

These parameters may be the ones in RACH-ConfigGeneric, as follows:

RACH-ConfigGeneric Information Element

```
-- ASN1START
-- TAG-RACH-CONFIGGENERIC-START
RACH-ConfigGeneric ::=        SEQUENCE {
    prach-ConfigurationIndex       INTEGER (0..255),
    msg1-FDM                       ENUMERATED {one, two, four, eight},
    msg1-FrequencyStart            INTEGER (0..maxNrofPhysicalResourceBlocks-1),
    zeroCorrelationZoneConfig      INTEGER(0..15),
    preambleReceivedTargetPower    INTEGER (-202..-60),
    preambleTransMax               ENUMERATED {n3, n4, n5, n6, n7, n8, n10, n20, n50, n100, n200},
    powerRampingStep               ENUMERATED {dB0, dB2, dB4, dB6},
    ra-ResponseWindow              ENUMERATED {sl1, sl2, sl4, sl8, sl10, sl20, sl40, sl80},
    ...
}
-- TAG-RACH-CONFIGGENERIC-STOP
-- ASN1STOP
```

RACH-ConfigGeneric field descriptions msg1-FDM

The number of PRACH transmission occasions FDMed in one time instance. (see TS 38.211, clause 6.3.3.2)

msg1-FrequencyStart

Offset of lowest PRACH transmission occasion in frequency domain with respective to PRB 0. The value is configured so that the corresponding RACH resource is entirely within the bandwidth of the UL BWP. (see TS 38.211, clause 6.3.3.2).

powerRampingStep

Power ramping steps for PRACH (see TS 38.321,5.1.3).

prach-ConfigurationIndex

PRACH configuration index. For prach-ConfigurationIndex configured under beamFailureRecovery-Config, the prach-ConfigurationIndex can only correspond to the short preamble format, (see TS 38.211, clause 6.3.3.2).

preambleReceivedTargetPower

The target power level at the network receiver side (see TS 38.213, clause 7.4, TS 38.321, clauses 5.1.2, 5.1.3). Only multiples of 2 dBm may be chosen (e.g. -202, -200, -198, ...).

preambleTransMax

Max number of RA preamble transmission performed before declaring a failure (see TS 38.321, clauses 5.1.4, 5.1.5).

ra-ResponseWindow

Msg2 (RAR) window length in number of slots. The network configures a value lower than or equal to 10 ms (see TS 38.321 [3], clause 5.1.4). UE ignores the field if included in SCellConfig.

zeroCorrelationZoneConfig

N-CS configuration, see Table 6.3.3.1-5 in TS 38.211 [16]

Some examples of parameters that may be tuned based on RACH report are the powerRampingStep and the ra-ResponseWindow.

The powerRampingStep defines the power ramping steps for PRACH as defined in TS 38.321, Section 5.1.3. A step that is too high means that the UE reaches the maximum power too fast, which might be unnecessary. A step that is too low may lead to too many attempts without a successful RAR reception until the UE succeeds. Thus, in particular embodiments the network may use the RACH report information (e.g., beam selection info as described above) to determine that the UE is taking too long until it succeeds, but eventually the UE does succeed at a certain power level. Based on the determination, the network may adjust the powerRampingStep.

The ra-ResponseWindow is the RAR window length in number of slots. The network configures a value lower than or equal to 10 ms (see TS 38.321, clause 5.1.4). If the value is too long, the UE waits too much until it detects that it needs to do beam selection again. Thus, in particular embodiments the network may use the RACH report information (e.g., measurement information) to determine that during a RACH procedure the UE failed in a specific beam and only succeeded after selecting a new beam i.e. it did not matter that the RAR window was too long, as the UE would anyway not succeed. Based on the determination, the network may decrease the RAR window. At other times the RAR window may be too short, leading to unnecessary retransmissions. The UE may have selected a beam, successfully transmitted the preamble that was detected in the network and, but while the network was processing the RAR, the UE may have stopped waiting because the RAR window expired. In this case, the reported beam measurements may indicate to the network that the RAR window should be increased.

Below is an example IE for RACH configuration.

RACH-ConfigCommon Information Element

```
-- ASN1START
-- TAG-RACH-CONFIGCOMMON-START
RACH-ConfigCommon ::=                           SEQUENCE {
    rach-ConfigGeneric                          ,
    totalNumberOfRA-Preambles                   INTEGER (1..63)
OPTIONAL,  -- Need S
    ssb-perRACH-OccasionAndCB-PreamblesPerSSB   CHOICE {
        oneEighth                               ENUMERATED
{n4,n8,n12,n16,n20,n24,n28,n32,n36,n40,n44,n48,n52,n56,n60,n64
},
        oneFourth                               ENUMERATED
{n4,n8,n12,n16,n20,n24,n28,n32,n36,n40,n44,n48,n52,n56,n60,n64
},
        oneHalf                                 ENUMERATED
{n4,n8,n12,n16,n20,n24,n28,n32,n36,n40,n44,n48,n52,n56,n60,n64
},
        one                                     ENUMERATED
{n4,n8,n12,n16,n20,n24,n28,n32,n36,n40,n44,n48,n52,n56,n60,n64
},
        two                                     ENUMERATED
{n4,n8,n12,n16,n20,n24,n28,n32},
        four                                    INTEGER (1..16),
        eight                                   INTEGER (1..8),
        sixteen                                 INTEGER (1..4)
    }
OPTIONAL,  -- Need M
    groupBconfigured                            SEQUENCE {
        ra-Msg3SizeGroupA                       ENUMERATED {b56,
b144, b208, b256, b282, b480, b640,
                                                b800,
b1000, b72, spare6, spare5,spare4, spare3, spare2, spare1},
        messagePowerOffsetGroupB                ENUMERATED {
minusinfinity, dB0, dB5, dB8, dB10, dB12, dB15, dB18},
        numberOfRA-PreamblesGroupA              INTEGER (1..64)
    }
OPTIONAL,  -- Need R
    ra-ContentionResolutionTimer                ENUMERATED { sf8,
sf16, sf24, sf32, sf40, sf48, sf56, sf64},
    rsrp-ThresholdSSB                           RSRP-Range
OPTIONAL,  -- Need R
    rsrp-ThresholdSSB-SUL                       RSRP-Range
OPTIONAL,  -- Cond SUL
    prach-RootSequenceIndex                     CHOICE {
        1839                                    INTEGER (0..837),
        1139                                    INTEGER (0..137)
    },
    msg1-SubcarrierSpacing                      SubcarrierSpacing
OPTIONAL,  -- Cond L139
    restrictedSetConfig                         ENUMERATED
{unrestrictedSet, restrictedSetTypeA, restrictedSetTypeB},
    msg3-transformPrecoder                      ENUMERATED {enabled}
OPTIONAL,  -- Need R
    ...
}
-- TAG-RACH-CONFIGCOMMON-STOP
-- ASN1STOP
```

| RACH-ConfigCommon field descriptions |
| --- |
| messagePowerOffsetGroupB |
| Threshold for preamble selection. Value in dB. Value minus infinity corresponds to −infinity. Value dB0 corresponds to 0 dB, dB5 corresponds to 5 dB and so on. (see TS 38.321, clause 5.1.2) |
| msg1-SubcarrierSpacing |
| Subcarrier spacing of PRACH (see TS 38.211, clause 5.3.2). Only the values 15 or 30 kHz (<6 GHz), 60 or 120 kHz (>6 GHz) are applicable (see TS 38.211). If absent, the UE applies the SCS as derived from the prach-ConfigurationIndex in RACH-ConfigGeneric (see tables Table 6.3.3.1-1 and Table 6.3.3.2-2, TS 38.211). The value also applies to contention free random access (RACH-ConfigDedicated), to SI-request and to contention-based beam failure recovery (CB-BFR). But it does not apply for contention free beam failure recovery (CF-BFR) (see BeamFailureRecoveryConfig). |
| msg3-transformPrecoder |
| Enables the transform precoder for Msg3 transmission. If the field is absent, the UE disables the transformer precoder (see TS 38.213, clause 8.3) |
| numberOfRA-PreamblesGroupA |
| The number of CB preambles per SSB in group A. This determines implicitly the number of CB preambles per SSB available in group B. (see TS 38.321, clause 5.1.1). The setting should be consistent with the setting of ssb-perRACH-OccasionAndCB-PreamblesPerSSB. |
| prach-RootSequenceIndex |
| PRACH root sequence index (see TS 38.211, clause 6.3.3.1). The value range depends on whether L = 839 or L = 139. The short/long preamble format indicated in this IE should be consistent with the one indicated in prach-ConfigurationIndex in the RACH-ConfigDedicated (if configured). |
| ra-ContentionResolutionTimer |
| The initial value for the contention resolution timer (see TS 38.321, clause 5.1.5). Value sf8 corresponds to 8 subframes, value sf16 corresponds to 16 subframes, and so on. |
| ra-Msg3SizeGroupA |
| Transport Blocks size threshold in bit below which the UE shall use a contention-based RA preamble of group A. (see TS 38.321, clause 5.1.2) |
| rach-ConfigGeneric |
| Generic RACH parameters |
| restrictedSetConfig |
| Configuration of an unrestricted set or one of two types of restricted sets, see TS 38.211, clause 6.3.3.1. |
| rsrp-ThresholdSSB |
| UE may select the SS block and corresponding PRACH resource for path-loss estimation and (re)transmission based on SS blocks that satisfy the threshold (see TS 38.213) |
| rsrp-ThresholdSSB-SUL |
| The UE selects SUL carrier to perform random access based on this threshold (see TS 38.321, clause 5.1.1). The value applies to all the BWPs. |
| ssb-perRACH-OccasionAndCB-PreamblesPerSSB |
| The meaning of this field is twofold: the CHOICE conveys the information about the number of SSBs per RACH occasion (L1 parameter 'SSB-per-rach-occasion'). Value oneEight corresponds to one SSB associated with 8 RACH occasions, value oneFourth corresponds to one SSB associated with 4 RACH occasions, and so on. The ENUMERATED part indicates the number of Contention Based preambles per SSB (L1 parameter 'CB-preambles-per-SSB'). Value n4 corresponds to 4 Contention Based preambles per SSB, value n8 corresponds to 8 Contention Based preambles per SSB, and so on. The total number of CB preambles in a RACH occasion is given by CB-preambles-per-SSB * max(1, SSB-per-rach-occasion). |
| totalNumberOfRA-Preambles |
| Total number of preambles used for contention based and contention free random access in the RACH resources defined in RACH-ConfigCommon, excluding preambles used for other purposes (e.g. for SI request). If the field is absent, the all 64 preambles are available for RA. The setting should be consistent with the setting of ssb-perRACH-OccasionAndCB-PreamblesPerSSB, i.e. it should be a multiple of the number of SSBs per RACH occasion. |

Figure 16:
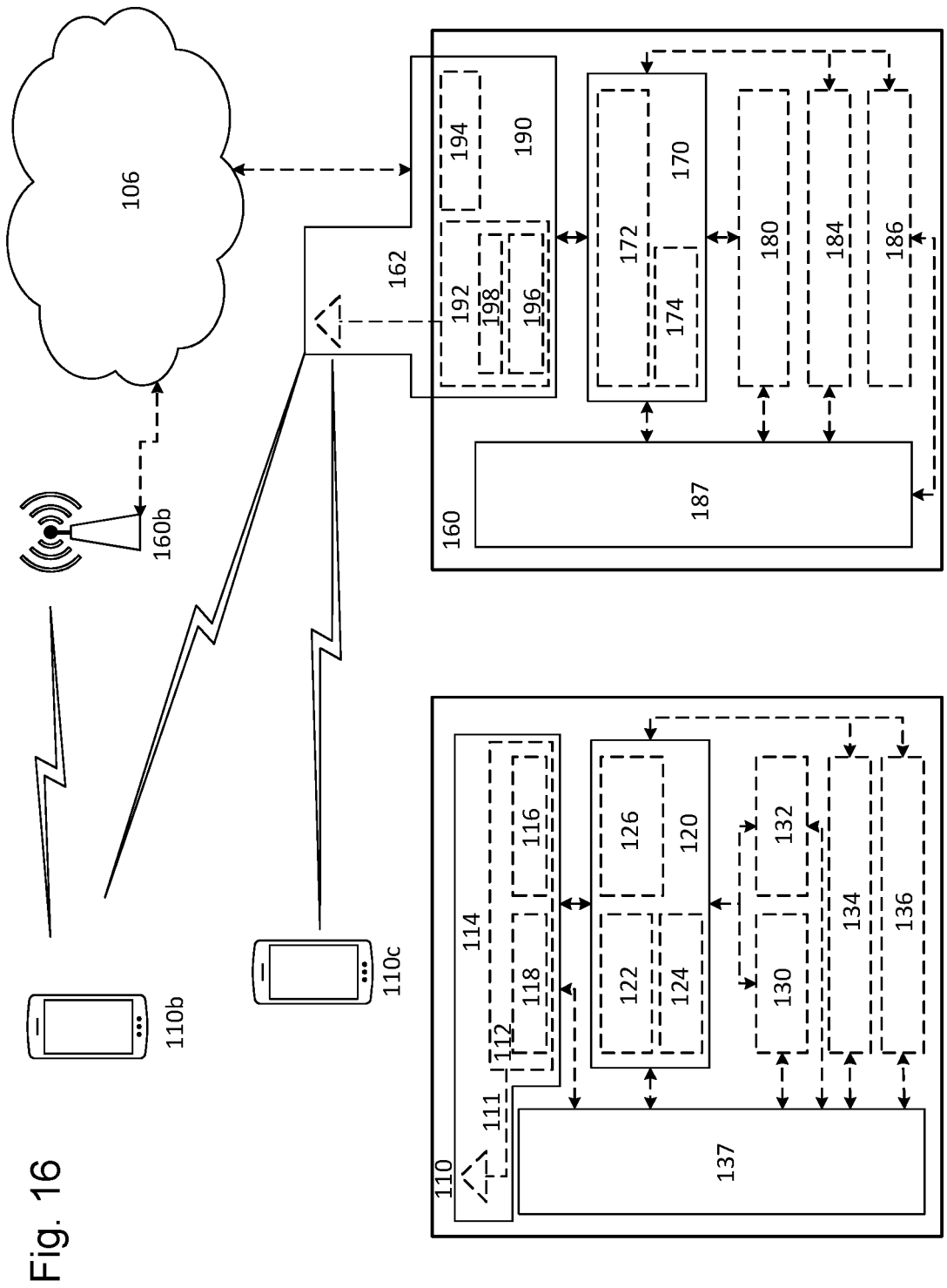
FIG. 16 is a block diagram illustrating an example wireless network.

FIG. 16 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 16, network node 160 includes processing circuitry 170, device readable medium 180, interface 190, auxiliary equipment 184, power source 186, power circuitry 187, and antenna 162. Although network node 160 illustrated in the example wireless network of FIG. 16 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB, gNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 16 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 16. For simplicity, the wireless network of FIG. 16 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 17:
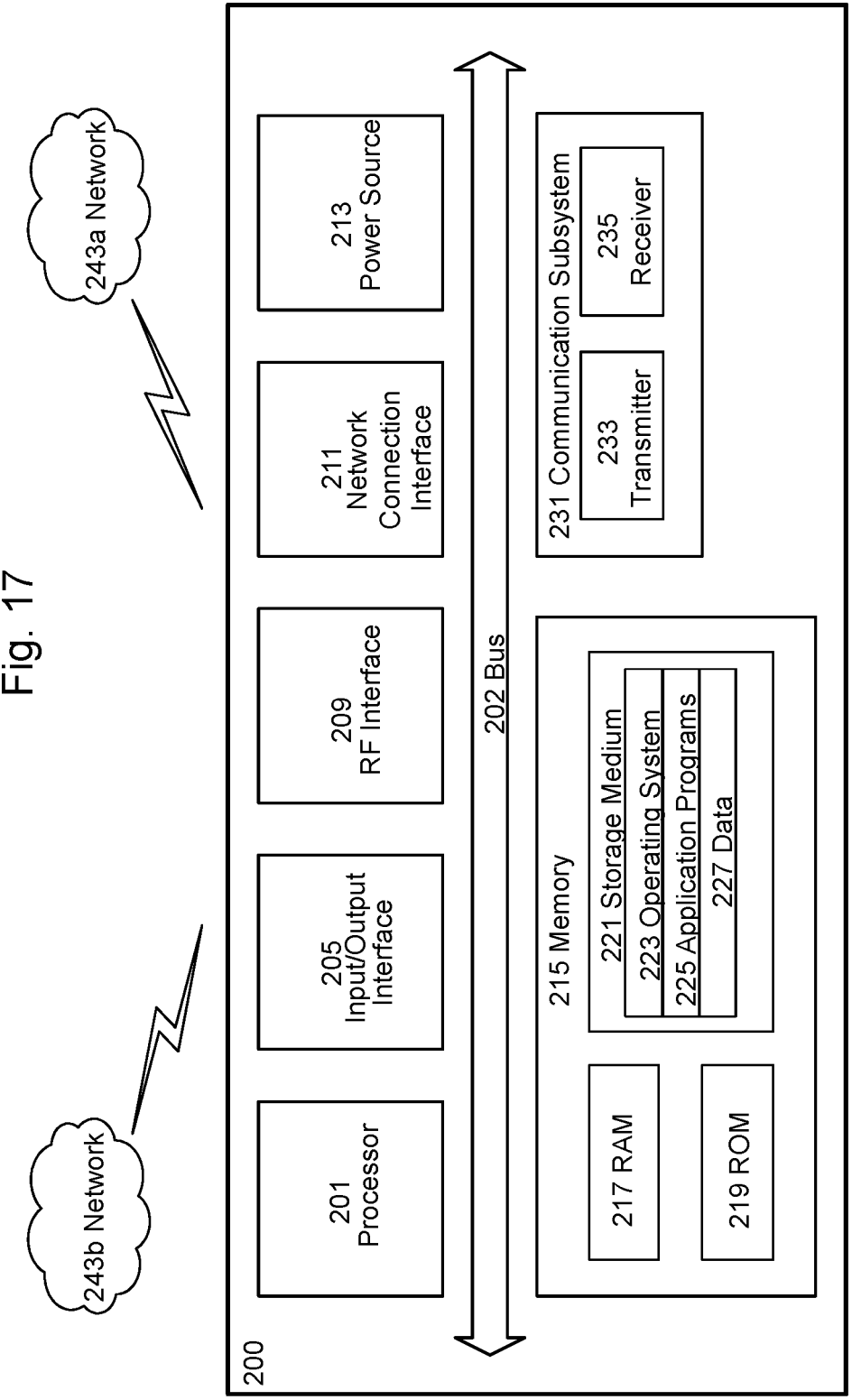
FIG. 17 illustrates an example user equipment, according to certain embodiments.

FIG. 17 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or NR standards. As mentioned previously, the term WD and UE may be used interchangeable. Accordingly, although FIG. 17 is a UE, the components discussed herein are equally applicable to a WD, and vice-versa.

In FIG. 17, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may use all the components shown in FIG. 17, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 17, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 18:
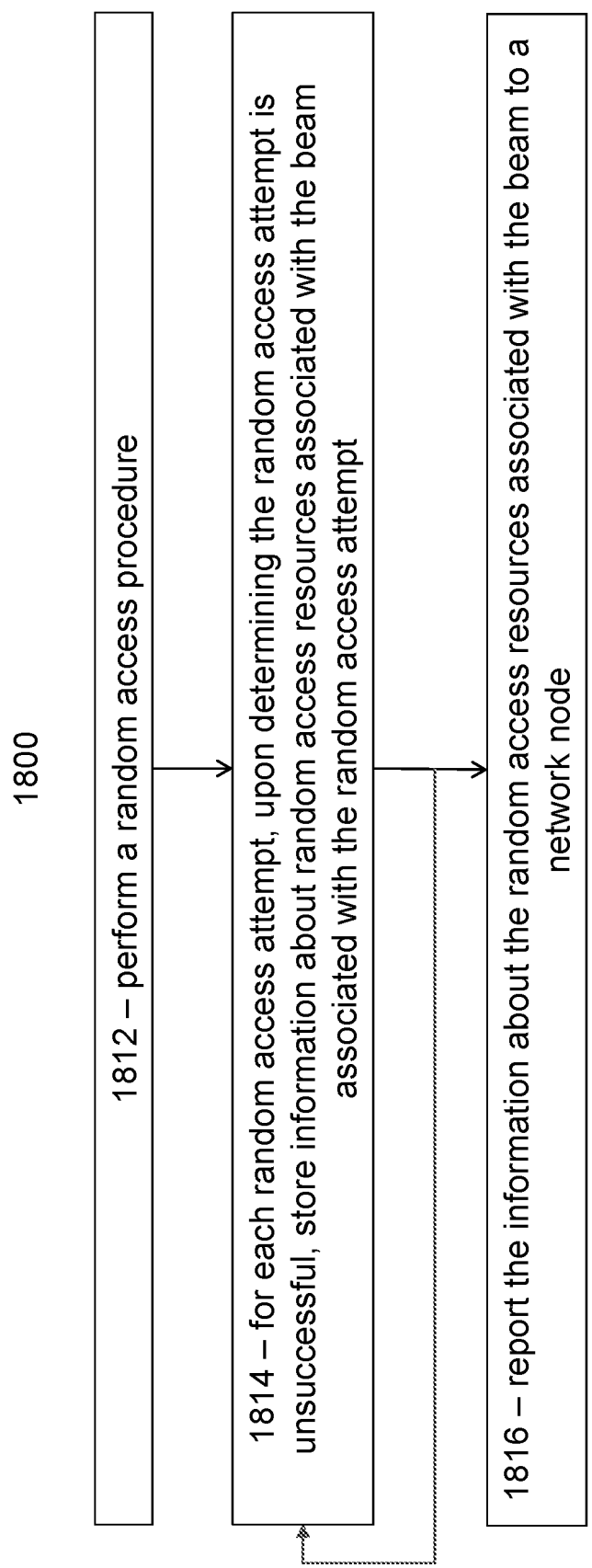
FIG. 18 is flowchart illustrating an example method in a wireless device, according to certain embodiments.

FIG. 18 is a flowchart illustrating an example method in a wireless device, according to certain embodiments. In particular embodiments, one or more steps of FIG. 18 may be performed by wireless device 110 described with respect to FIG. 16.

The method begins at step 1812, where the wireless device (e.g., wireless device 110) performs a random access procedure. The random access procedure comprises a plurality of random access attempts, and each random access attempt is associated with a beam. For example, wireless device 110 may select a random access preamble and an uplink beam. Wireless device 110 may transmit the random access preamble to network node 160.

At step 1814, for each random access attempt, the wireless device, upon determining the random access attempt is unsuccessful, stores information about random access resources associated with the beam associated with the random access attempt. For example, wireless device 110 may not receive a random access response from network node 120 within a particular of window of time after sending the random access preamble, or wireless device 110 may detect that contention occurred. In general, determining the random access attempt is unsuccessful comprises determining transmission of a RACH preamble failed and/or determining contention occurred during the random access attempt. In addition, any event other than a successful completion of the random access procedure may be considered an unsuccessful random access attempt. Examples of unsuccessful random access attempts are described in more detail above.

In particular embodiments, the information about random access resources associated with the beam associated with the random access attempt comprises an indication of whether the beam is the same beam as a previous unsuccessful random access attempt, a beam identifier such as a SSB identifier or a CSI-RS identifier, a reference signal measurement value associated with beam, an amount of time between when the reference signal measurement value associated with beam was measured and when the beam was used for the random access attempt, and/or a reference signal measurement value associated with a neighboring beam. Additional examples of information that may be stored are described in more detail above.

The wireless device may repeat step 1814 for each failed random access attempt until the random access procedure is successful. In some embodiments, the wireless device may store information about the random access resources associated with the beam associated with a successful random access attempt. In particular embodiments, the information about random access resources associated with the beam associated with the random access attempt is stored chronologically in the order that the random access attempt occurred.

At step 1816, the wireless device reports the information about the random access resources associated with the beam to a network node. For example, wireless device 110 may send a RACH report to network node 160. The wireless device may send the report upon successful completion of the random access procedure, upon request from the network node, or at any other suitable time.

Network node 160 may use the information about the random access resources associated with the beam to reconfigure network and/or random access parameters according to any of the embodiments and examples described above. Network node 160 may send the information about the random access resources associated with the beam to other network nodes, such a neighbor nodes.

Modifications, additions, or omissions may be made to method 1800 of FIG. 18. Additionally, one or more steps in the method of FIG. 18 may be performed in parallel or in any suitable order.

Figure 19:
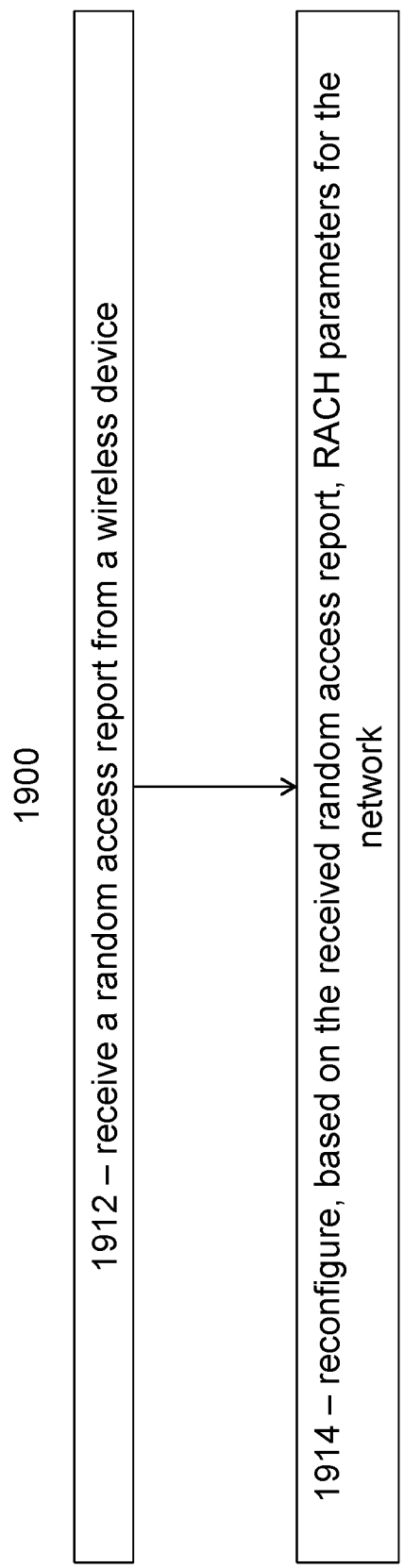
FIG. 19 is a flowchart illustrating an example method in a network node, according to certain embodiments.

FIG. 19 is a flowchart illustrating an example method in a network node, according to certain embodiments. In particular embodiments, one or more steps of FIG. 19 may be performed by network node 160 described with respect to FIG. 16.

The method may begin at step 1912, where the network node (e.g., network node 160) receiving a random access report from a wireless device (e.g., wireless device 110). The random access report includes information about a plurality of random access attempts, each random access attempt associated with a beam, and for each random access attempt the random access report includes information about random access resources associated with the beam associated with the random access attempt. The information about the random access resources associated with the beam is described with respect to step 1814 of FIG. 18 and with respect to any of the embodiments and examples described above.

In particular embodiments, the information about random access resources associated with the beam associated with the random access attempt is stored chronologically in the order that the random access attempt occurred. Accordingly, the network node can determine the order in which the random access attempts were performed based on the ordering of the received information.

At step 1914, the network node reconfigures RACH parameters for the network based on the received random access report. In particular embodiments, reconfiguring RACH parameters comprises modifying at least one of a number of available RACH preambles and a maximum number of random access attempts. Other examples are described above.

Modifications, additions, or omissions may be made to method 1900 of FIG. 19. Additionally, one or more steps in the method of FIG. 19 may be performed in parallel or in any suitable order.

Figure 20:
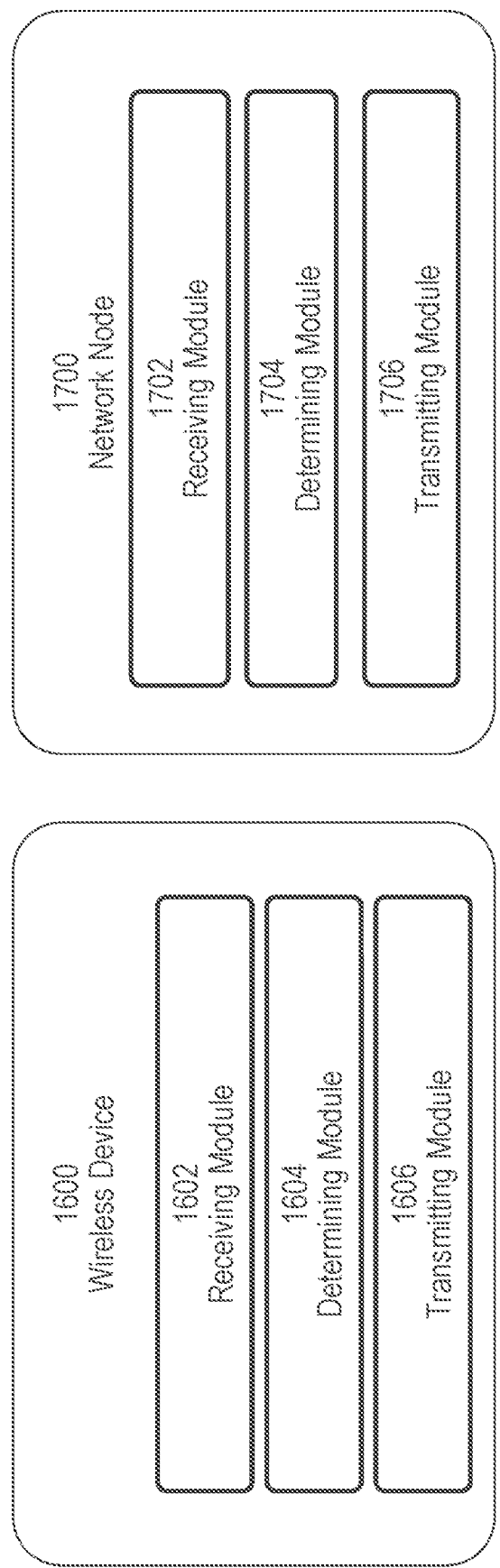
FIG. 20 illustrates a schematic block diagram of a wireless device and network node in a wireless network, according to certain embodiments.

FIG. 20 illustrates a schematic block diagram of two apparatuses in a wireless network (for example, the wireless network illustrated in FIG. 16). The apparatuses include a wireless device and a network node (e.g., wireless device 110 and network node 160 illustrated in FIG. 16). Apparatuses 1600 and 1700 are operable to carry out the example methods described with reference to FIGS. 18 and 19, respectively, and possibly any other processes or methods disclosed herein. It is also to be understood that the methods of FIGS. 18 and 19 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 20, apparatus 1600 includes receiving module 1602 configured to receive random access messages, according to any of the embodiments and examples described herein. Apparatus 1600 also includes determining module 1604 configured to determine whether a random access attempt is successful, to store in information about random access attempts, and to select a particular beam and/or power level for a random access attempt, according to any of the embodiments and examples described herein. Transmitting module 1606 is configured to transmit a RACH report, according to any of the embodiments and examples described herein.

As illustrated in FIG. 20, apparatus 1700 includes receiving module 1702 configured to receive random access messages from a wireless device, including receiving a RACH report, according to any of the embodiments and examples described herein. Apparatus 1700 also includes determining module 1704 configured to determine whether to adjust a random access or network parameter based on the received RACH report, according to any of the embodiments and examples described herein. Transmitting module 1706 is configured to transmit a RACH report to another network node and to transmit random access messages to a wireless device, according to any of the embodiments and examples described herein.

Figure 21:
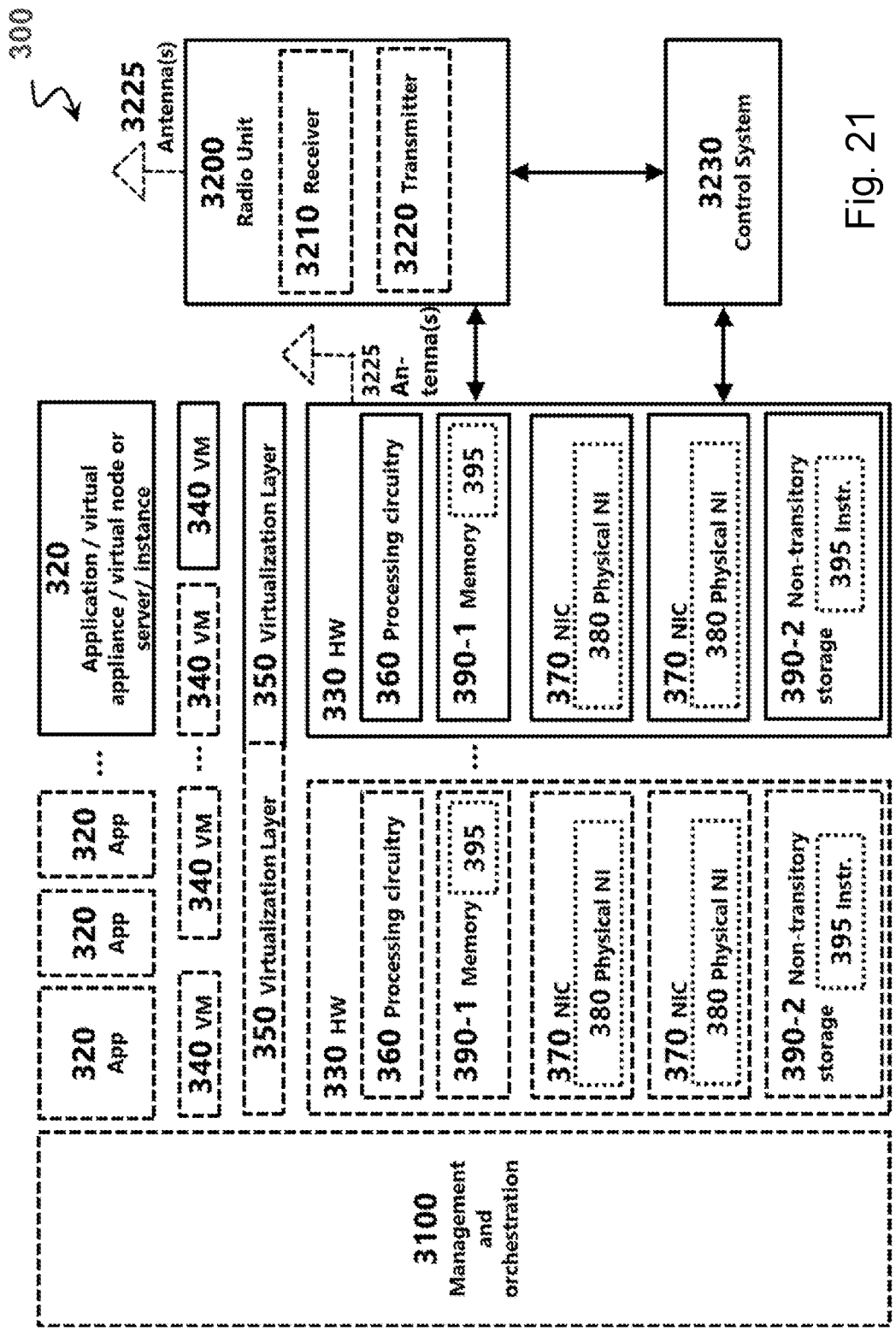
FIG. 21 illustrates an example virtualization environment, according to certain embodiments.

FIG. 21 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 21, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 22:
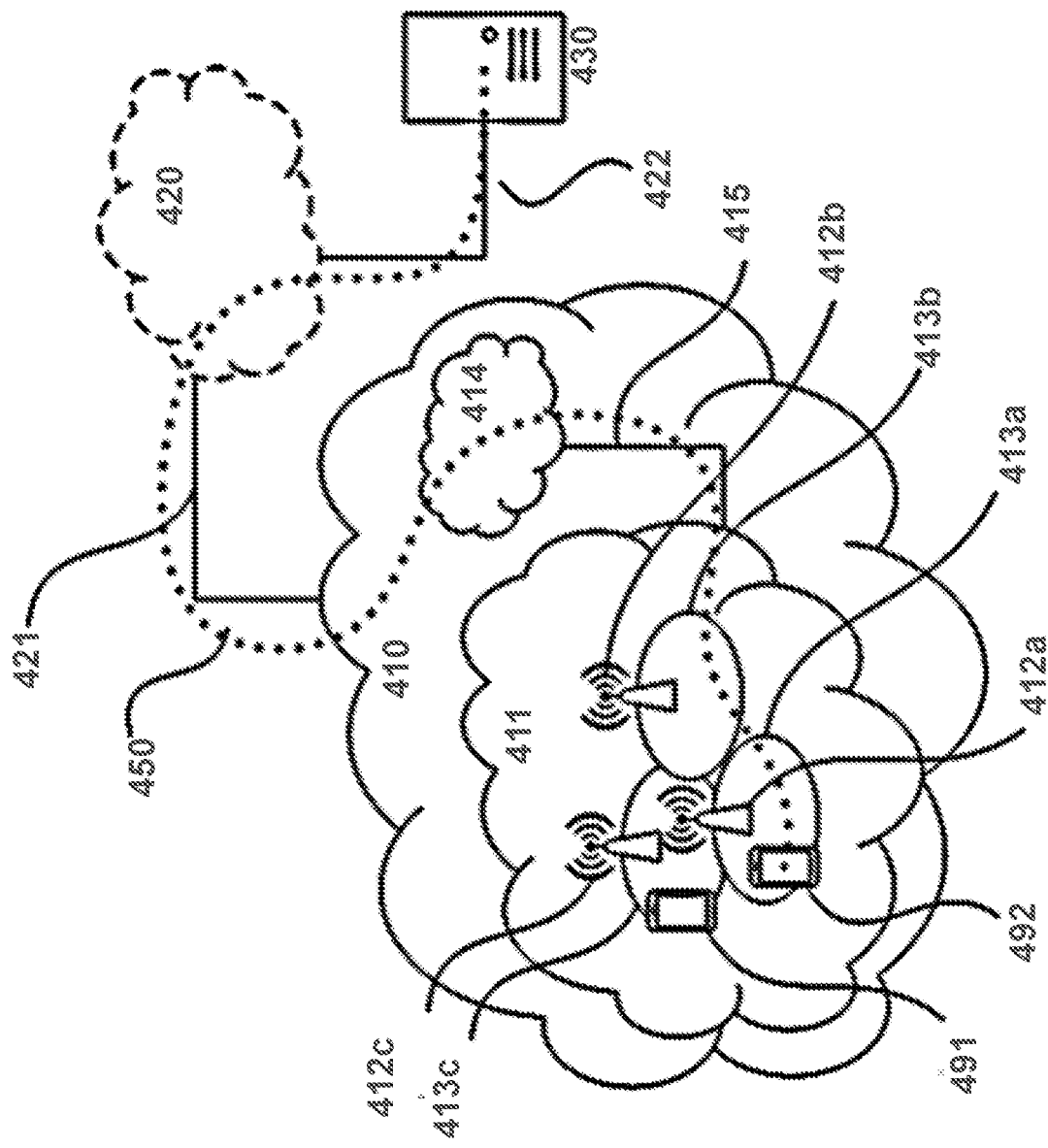
FIG. 22 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 22.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 22, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 22 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 23:
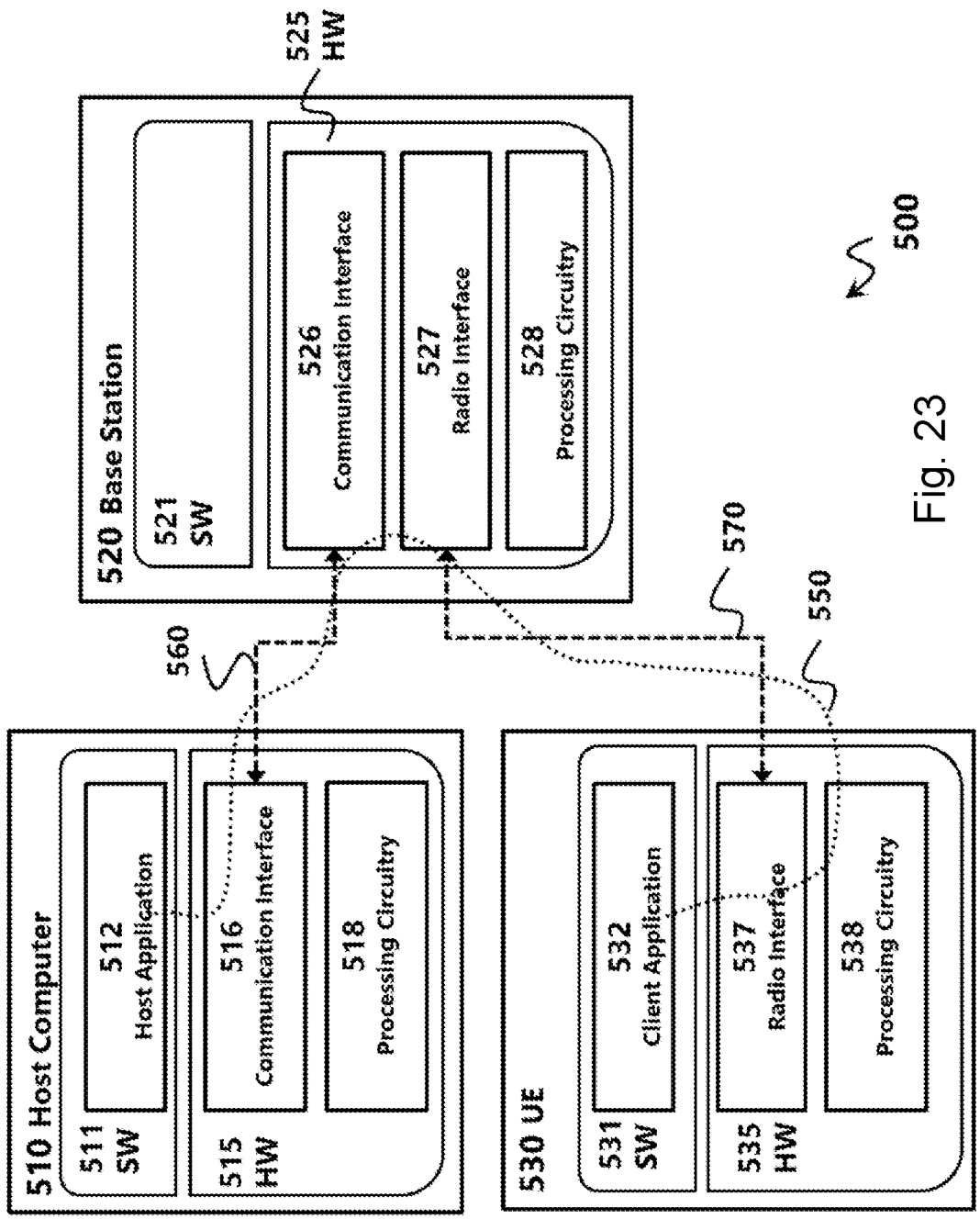
FIG. 23 illustrates an example host computer communicating via a base station with a user equipment over a partially wireless connection, according to certain embodiments.

FIG. 23 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 23. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 23) served by base station 520. Communication interface 526 may be configured to facilitate connection 560 to host computer 510. Connection 560 may be direct, or it may pass through a core network (not shown in FIG. 23) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 23 may be similar or identical to host computer 430, one of base stations 412*a*, 412*b*, 412*c* and one of UEs 491, 492 of FIG. 22, respectively. This is to say, the inner workings of these entities may be as shown in FIG. 23 and independently, the surrounding network topology may be that of FIG. 22.

In FIG. 23, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 24:
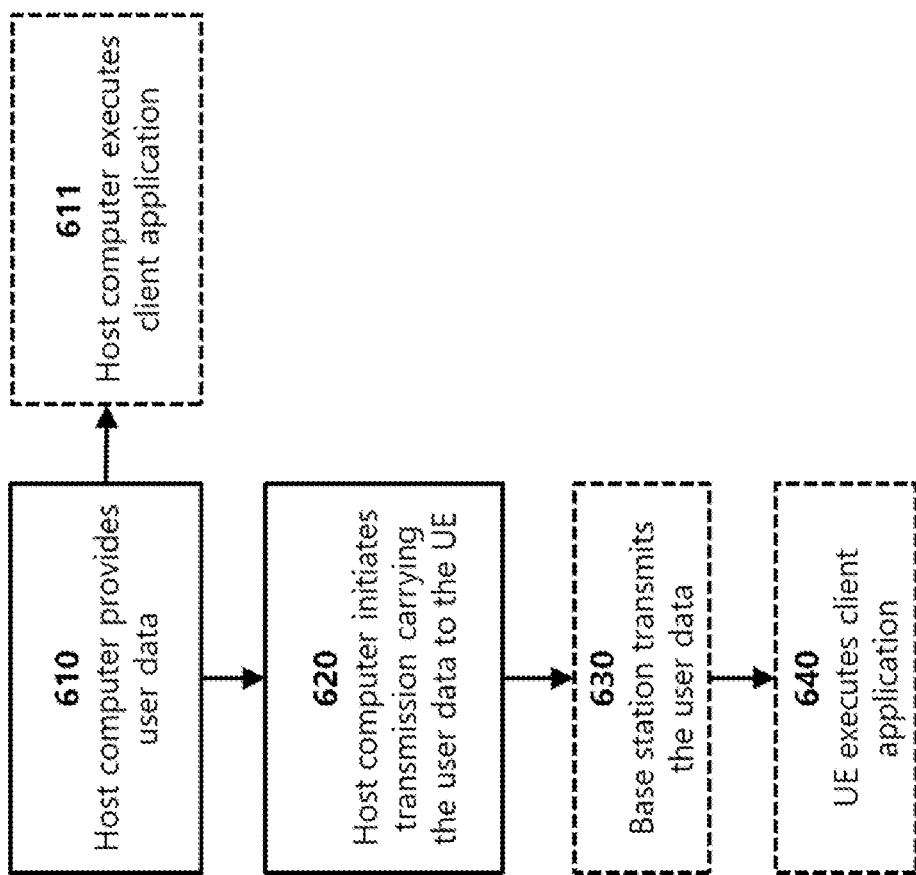
FIG. 24 is a flowchart illustrating a method implemented, according to certain embodiments.

FIG. 24 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 24 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 25:
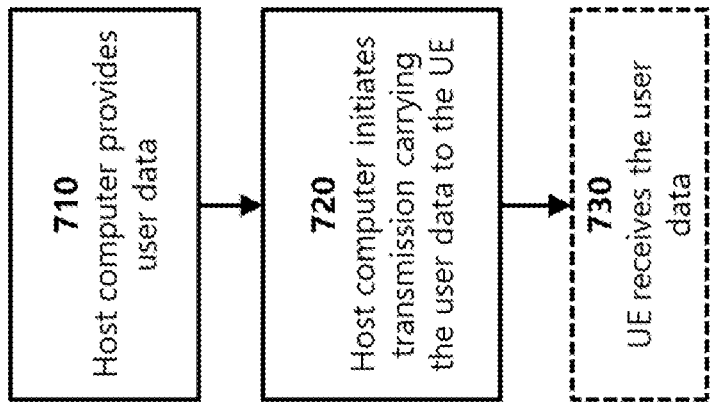
FIG. 25 is a flowchart illustrating a method implemented in a communication system, according to certain embodiments.

FIG. 25 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 25 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 26:
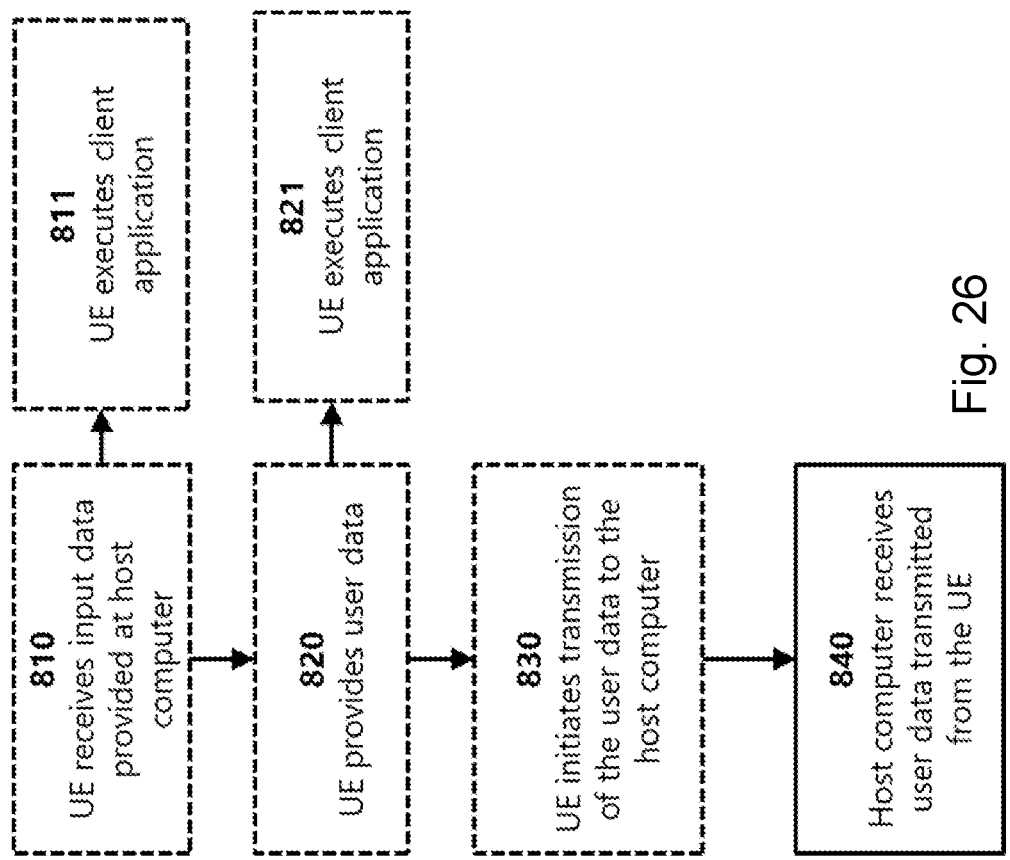
FIG. 26 is a flowchart illustrating a method implemented in a communication system, according to certain embodiments.

FIG. 26 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 26 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 27:
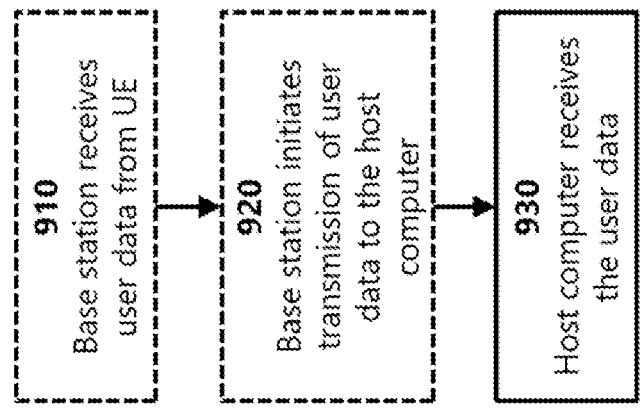
FIG. 27 is a flowchart illustrating a method implemented in a communication system, according to certain embodiments.

FIG. 27 is a flowchart illustrating a method implemented in a communication system, in accordance with one embodiment. The communication system includes a host computer, a base station and a UE which may be those described with reference to FIGS. 22 and 23. For simplicity of the present disclosure, only drawing references to FIG. 27 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GC 5th Generation Core
ANR Automatic Neighbor Relation
BCCH Broadcast Control Channel
BCH Broadcast Channel
BWP Bandwidth Part
CA Carrier Aggregation
CBRA Contention Based Random Access
CC Carrier Component
CDMA Code Division Multiplexing Access
CN Core Network
CORESET Control Resource Set
CQI Channel Quality information
C-RNTI Cell RNTI
CSI Channel State Information
DCCH Dedicated Control Channel
DCI Downlink Control Information
DL Downlink
DM Demodulation
DMRS Demodulation Reference Signal
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GSM Global System for Mobile communication
HSPA High Speed Packet Access
HRPD High Rate Packet Data
ID Identity/Identifier
IE Information Element
LTE Long-Term Evolution
MAC Medium Access Control
MBMS Multimedia Broadcast Multicast Services MBSFN Multimedia Broadcast multicast service Single Frequency Network
NPDCCH Narrowband Physical Downlink Control Channel
NAS Non-Access Stratum
NGC Next Generation Core
NG-RAN Next Generation RAN
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
P-CCPCH Primary Common Control Physical Channel
PCell Primary Cell
PCFICH Physical Control Format Indicator Channel
PCI Physical Cell Identifier
PDCCH Physical Downlink Control Channel
PDSCH Physical Downlink Shared Channel
PGW Packet Gateway
PLMN Public Land Mobile Network
PMI Precoder Matrix Indicator
PRACH Physical Random Access Channel
PRB Physical Resource Block
PUCCH Physical Uplink Control Channel
PUSCH Physical Uplink Shared Channel
RACH Random Access Channel
RAN Radio Access Network
RAR Random Access Response
RA-RNTI Random Access RNTI
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
SCell Secondary Cell
SGW Serving Gateway
SI System Information
SNR Signal to Noise Ratio
SON Self-Optimizing Network
SS Synchronization Signal
SSS Secondary Synchronization Signal
TDD Time Division Duplex
TTI Transmission Time Interval
UE User Equipment
UL Uplink
UMTS Universal Mobile Telecommunication System
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device for reporting random access attempts, the method comprising:
    performing a random access procedure, wherein the random access procedure comprises a plurality of random access attempts, each random access attempt associated with a beam;
    for each random access attempt, upon determining the random access attempt is unsuccessful, storing information about random access resources associated with the beam associated with the random access attempt, wherein the information about random access resources associated with the beam associated with the random access attempt comprises an indication of whether power ramping was applied to the random access attempt; and
    reporting the information about the random access resources associated with the beam to a network node.

2. A wireless device capable of reporting random access attempts, the wireless device comprising processing circuitry operable to:
    perform a random access procedure, wherein the random access procedure comprises a plurality of random access attempts, each random access attempt associated with a beam;
    for each random access attempt, upon determining the random access attempt is unsuccessful, store information about random access resources associated with the beam associated with the random access attempt, wherein the information about random access resources associated with the beam associated with the random access attempt comprises an indication of whether power ramping was applied to the random access attempt; and
    report the information about the random access resources associated with the beam to a network node.

3. The wireless device of claim 2, the processing circuitry further operable to, for each random access attempt, upon determining the random access attempt is successful, store information about random access resources associated with the beam associated with the random access attempt.

4. The wireless device of claim 2, wherein the processing circuitry is operable to determine the random access attempt is unsuccessful by determining transmission of a random access channel (RACH) preamble failed.

5. The wireless device of claim 2, wherein the processing circuitry is operable to determine the random access attempt is unsuccessful by determining contention occurred during the random access attempt.

6. The wireless device of claim 2, wherein the information about random access resources associated with the beam associated with the random access attempt comprises a beam identifier.

7. The wireless device of claim 6, wherein the beam identifier is one of a synchronization signal block (SSB) identifier and a channel state information reference signal (CSI-RS) identifier.

8. The wireless device of claim 2, wherein the information about random access resources associated with the beam associated with the random access attempt comprises a reference signal measurement value associated with beam.

9. The wireless device of claim 8, wherein the information about random access resources associated with the beam associated with the random access attempt further comprises an amount of time between when the reference signal measurement value associated with beam was measured and when the beam was used for the random access attempt.

10. The wireless device of claim 2, wherein the information about random access resources associated with the beam associated with the random access attempt comprises a reference signal measurement value associated with a neighboring beam.

11. The wireless device of claim 2, wherein the information about random access resources associated with the beam associated with the random access attempt is stored chronologically in the order that the random access attempt occurred.

12. A method performed by a network node for reconfiguring random access resources, the method comprising:
   receiving a random access report from a wireless device, wherein the random access report includes information about a plurality of random access attempts, each random access attempt associated with a beam, and for each random access attempt the random access report includes information about random access resources associated with the beam associated with the random access attempt, wherein the information about random access resources associated with the beam associated with the random access attempt comprises an indication of whether power ramping was applied to the random access attempt; and
   reconfiguring, based on the received random access report, random access channel RACH) parameters for the network.

13. A network node capable of reconfiguring random access resources, the network node comprising processing circuitry operable to:
   receive a random access report from a wireless device, wherein the random access report includes information about a plurality of random access attempts, each random access attempt associated with a beam, and for each random access attempt the random access report includes information about random access resources associated with the beam associated with the random access attempt, wherein the information about random access resources associated with the beam associated with the random access attempt comprises an indication of whether power ramping was applied to the random access attempt; and
   reconfigure, based on the received random access report, random access channel (RACH) parameters for the network.

14. The network node of claim 13, wherein the processing circuitry is operable to reconfigure RACH parameters by modifying at least one of a number of available RACH preambles and a maximum number of random access attempts.

15. The network node of claim 13, wherein the information about random access resources associated with the beam associated with the random access attempt comprises a beam identifier.

16. The network node of claim 15, wherein the beam identifier is one of a synchronization signal block (SSB) identifier and a channel state information reference signal (CSI-RS) identifier.

17. The network node of claim 13, wherein the information about random access resources associated with the beam associated with the random access attempt comprises a reference signal measurement value associated with beam.

18. The network node of claim 17, wherein the information about random access resources associated with the beam associated with the random access attempt further comprises an amount of time between when the reference signal measurement value associated with beam was measured and when the beam was used for the random access attempt.

* * * * *